US012562800B2

(12) United States Patent
 Abinader et al.

(10) Patent No.: US 12,562,800 B2
(45) Date of Patent: Feb. 24, 2026

(54) APPARATUS AND METHOD TO PERFORM A BEAM ALIGNMENT PROCEDURE BASED ON AN ESTIMATED TIME-OF-STAY

(71) Applicant: NOKIA TECHNOLOGIES OY, Espoo (FI)

(72) Inventors: Fuad Abinader, Massy (FR); Christian Rom, Aalborg (DK); István Zsolt Kovács, Aalborg (DK)

(73) Assignee: NOKIA TECHNOLOGIES OY, Espoo (FI)

( * ) Notice: Subject to any disclaimer, the term of this patent is extended or adjusted under 35 U.S.C. 154(b) by 380 days.

(21) Appl. No.: 18/044,068

(22) PCT Filed: Oct. 13, 2020

(86) PCT No.: PCT/EP2020/078720
 § 371 (c)(1),
 (2) Date: Mar. 3, 2023

(87) PCT Pub. No.: WO2022/078574
 PCT Pub. Date: Apr. 21, 2022

(65) Prior Publication Data
 US 2023/0318684 A1 Oct. 5, 2023

(51) Int. Cl.
 *H04B 7/06* (2006.01)
 *H04B 7/08* (2006.01)
(52) U.S. Cl.
 CPC ..... *H04B 7/06952* (2023.05); *H04B 7/06956* (2023.05); *H04B 7/088* (2013.01)

(58) Field of Classification Search
 CPC .. H04B 7/06952; H04B 7/088; H04B 7/0691; H04B 7/0874; H04B 7/0404; H04B 7/0695; H04B 7/06; H04B 7/0417; H04B 7/10
 See application file for complete search history.

(56) References Cited

U.S. PATENT DOCUMENTS

| | | | | |
|---|---|---|---|---|
| 2019/0341992 | A1* | 11/2019 | Zhou | H04W 16/28 |
| 2021/0125611 | A1* | 4/2021 | Yu | G10L 15/197 |
| 2021/0403022 | A1* | 12/2021 | Hong | G06N 3/0499 |
| 2021/0405758 | A1* | 12/2021 | Kim | G02B 27/017 |
| 2022/0094417 | A1* | 3/2022 | Ashari | H04B 7/088 |

(Continued)

FOREIGN PATENT DOCUMENTS

WO 2019228614 A1 12/2019

OTHER PUBLICATIONS

International Search Report and Written Opinion for International Application No. PCT/EP2020/078720, mailed on Jun. 24, 2021, 14 pages.

*Primary Examiner* — Mewale A Ambaye
(74) *Attorney, Agent, or Firm* — Barta Jones, PLLC

(57) ABSTRACT

An apparatus is provided for intelligently managing beam alignment. The apparatus receives one or more estimation models, which are used to determine an estimated time-of-stay of an active antenna panel. The time-of-stay represents the duration for which the panel is active for transmission or reception. Based on this estimated time-of-stay, the apparatus determines whether it is beneficial to perform a narrow beam alignment procedure. The apparatus avoids performing the procedure if the antenna panel is not expected to remain active long enough, thereby improving efficiency.

9 Claims, 20 Drawing Sheets

(56) References Cited

U.S. PATENT DOCUMENTS

| | | | |
|---|---|---|---|
| 2022/0132583 A1* | 4/2022 | Ko | H04L 1/00 |
| 2022/0209842 A1* | 6/2022 | Dutta | H04W 24/10 |
| 2022/0240309 A1* | 7/2022 | Sakhnini | H04L 5/0023 |

* cited by examiner

802 gNB

804

UE

101
UE notifies gNB that it supports *UE Panel ToS KPI Reporting* and *gNB-assisted Contexual Models for UE Panel ToS*

102
gNB decides to receive *UE Panel ToS KPI Reports* from UE

103
gNB configures at UE a RRM Measurement Object for *UE Panel ToS KPIs* and other information for correlation

802 gNB

804

UE

201
UE collects *UE panel ToS KPIs* and additional contextual information

202
UE reports *UE Panel ToS KPIs* and additional contextual information

203
gNB stores *UE panel ToS KPIs* and additional contextual information

301
gNB uses collected UE panel KPIs and correlated measurements to create/update estimation models for UE panel TOSs

802 gNB

804

UE

401
gNB detects the need for sending the created/updated estimation models for mean UE panel ToS, e.g. due to HO, beam switch, localization update, etc..

402
gNB sends the created/updated estimation model(s) for mean UE panel ToS to the UE

403
UE stores newly-received estimation model for mean UE panel TOS

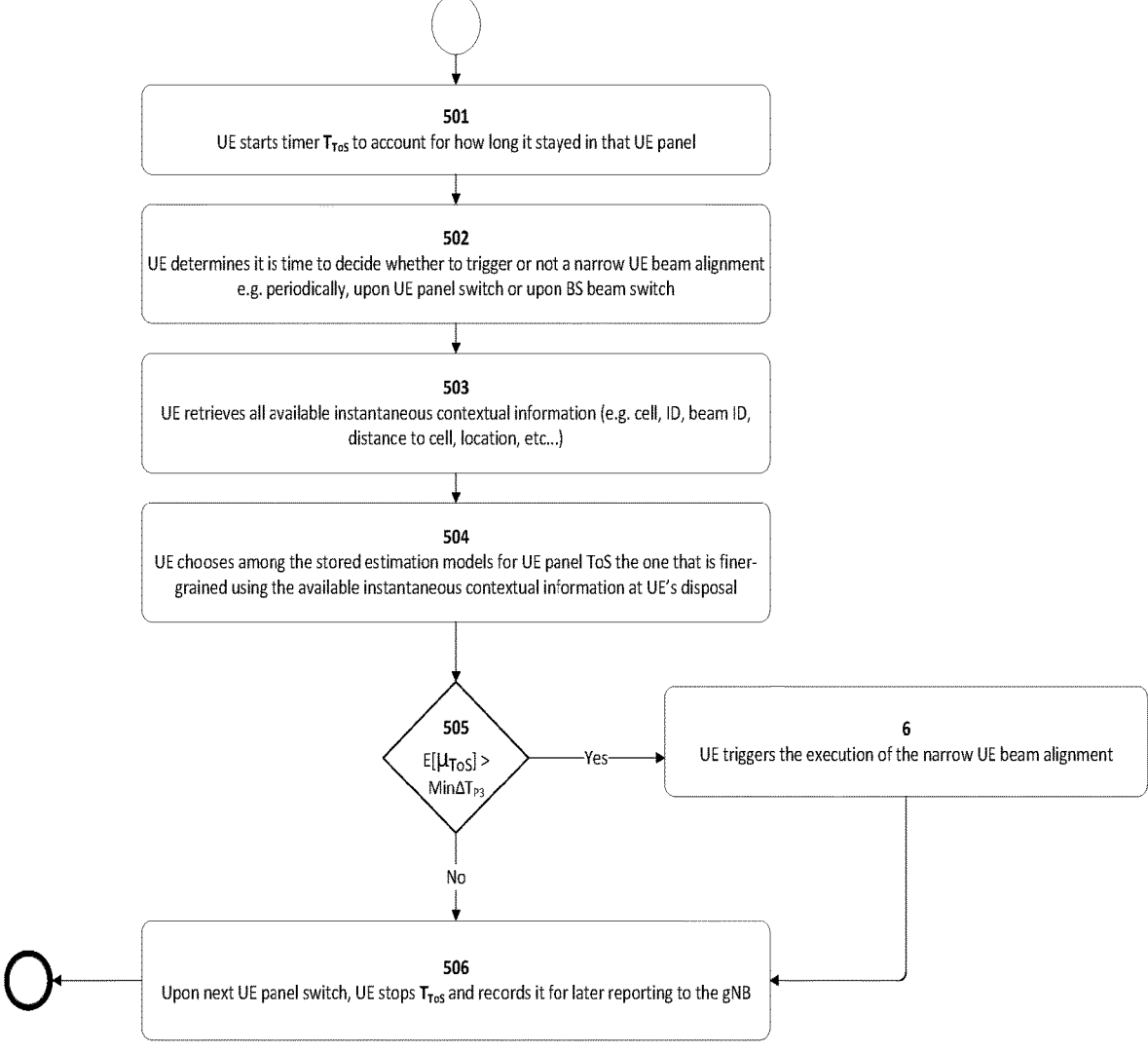

501
UE starts timer $T_{ToS}$ to account for how long it stayed in that UE panel

502
UE determines it is time to decide whether to trigger or not a narrow UE beam alignment e.g. periodically, upon UE panel switch or upon BS beam switch

503
UE retrieves all available instantaneous contextual information (e.g. cell, ID, beam ID, distance to cell, location, etc...)

504
UE chooses among the stored estimation models for UE panel ToS the one that is finer-grained using the available instantaneous contextual information at UE's disposal

505
$E[\mu_{ToS}] > Min\Delta T_{P3}$

—Yes→

6
UE triggers the execution of the narrow UE beam alignment

No

506
Upon next UE panel switch, UE stops $T_{ToS}$ and records it for later reporting to the gNB

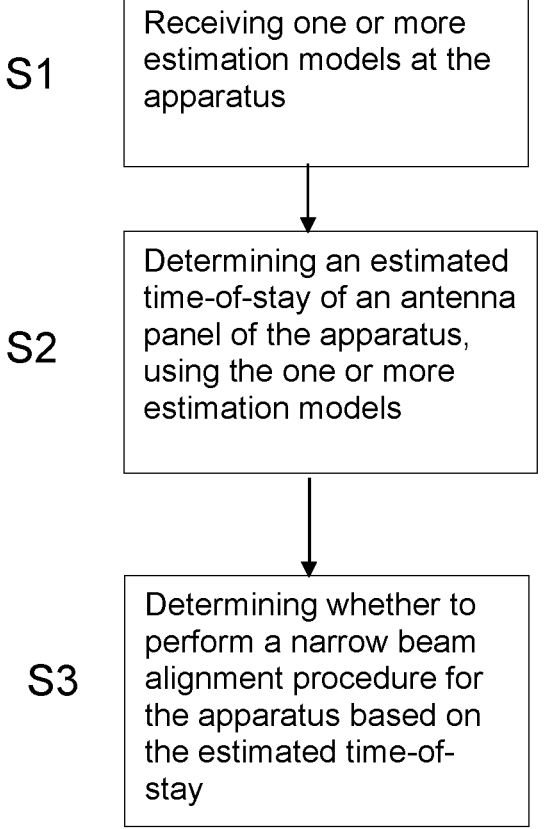

S1    Receiving one or more estimation models at the apparatus

S2    Determining an estimated time-of-stay of an antenna panel of the apparatus, using the one or more estimation models S3    Determining whether to perform a narrow beam alignment procedure for the apparatus based on the estimated time-of-stay

Fig. 19

S1    Sending one or more estimation models to a user equipment. The one or more estimation models is configured for enabling the user equipment to determine an estimated time-of-stay of an antenna panel of the user equipment.

Fig. 20

2102    2100a
2102    2100b
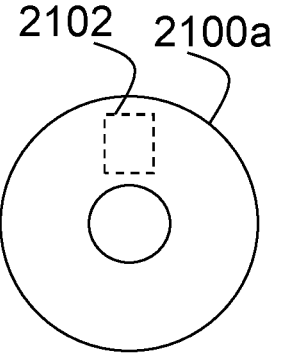
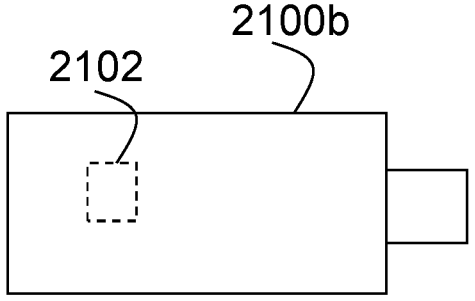
Fig. 21

APPARATUS AND METHOD TO PERFORM A BEAM ALIGNMENT PROCEDURE BASED ON AN ESTIMATED TIME-OF-STAY

CROSS-REFERENCE TO RELATED APPLICATIONS

This application is a national stage entry of International Application No. PCT/EP2020/078720, filed Oct. 13, 2020, entitled "APPARATUS, METHODS AND COMPUTER PROGRAMS" which is hereby incorporated by reference in its entirety.

FIELD

This disclosure relates to communications, and more particularly to apparatus, methods and computer programs in a wireless communication system. More particularly the present invention relates to beam alignment.

BACKGROUND

A communication system can be seen as a facility that enables communication between two or more devices such as user terminals, machine-like terminals, base stations and/or other nodes by providing communication channels for carrying information between the communicating devices. A communication system can be provided for example by means of a communication network and one or more compatible communication devices.

A user can access a communication system by means of an appropriate communication device or terminal capable of communicating with a base station. Hence nodes like base stations are often referred to as access points. A communication device of a user is often referred to as user equipment (UE). A communication device is provided with an appropriate signal receiving and transmitting apparatus for enabling communications, for example enabling communications with the base station and/or communications directly with other user devices. The communication device can communicate on appropriate channels, e.g. listen to a channel on which a station, for example a base station of a cell, transmits.

A communication system and associated devices typically operate in accordance with a given standard or specification which sets out what the various entities associated with the system are permitted to do and how that should be achieved.

Since introduction of fourth generation (4G) services increasing interest has been paid to the next, or fifth generation (5G) standard. 5G may also be referred to as a New Radio (NR) network. 5G NR is a beam-based radio access network

STATEMENT OF INVENTION

According to a first aspect there is provided an apparatus comprising means for performing: receiving one or more estimation models at the apparatus; determining an estimated time-of-stay of an antenna panel of the apparatus using the one or more estimation models, the time-of-stay comprising a duration for which the antenna panel is active for transmission and/or reception; and determining whether to perform a narrow beam alignment procedure for the apparatus based on the estimated time-of-stay.

According to some examples, the means are further configured to use the one or more estimation models for estimating the time-of-stay of the antenna for a given context.

According to some examples, the given context comprises one or more of: a duration for which the apparatus is communicating with a base station beam; a duration for which the apparatus is in a cell; a duration for which the apparatus is in a geographical region.

According to some examples, the means are further configured to perform selecting an estimation model to use from the received one or more estimation models.

According to some examples, the means are further configured to perform selecting an estimation model having a finest level of granularity that the apparatus can support.

According to some examples, the one or more estimation models are comprised in an information element received during radio resource control signalling.

According to some examples, the means are further configured to perform receiving information of a mean expected duration of channel state information reference signal repetition bursts in a cell, and to use the information of mean expected duration of channel state information reference signal repetition bursts when determining whether to perform the narrow beam alignment procedure for the apparatus.

According to some examples, the means are further configured to, in response to determining that the estimated time-of-stay meets or exceeds a threshold value, perform the narrow beam alignment procedure; or, in response to determining that the determined time-of-stay does not meet or exceed the threshold value, prevent performance of the narrow beam alignment procedure.

According to some examples, the means are further configured to monitor an actual time-of-stay of the antenna panel, and to send feedback of effectiveness of the received one or more estimation models based on a comparison between the predicted time of stay and the actual time of stay.

According to some examples, the means are further configured to perform sending the feedback of effectiveness in an information element as part of radio resource control signalling.

According to some examples, the means are further configured to perform sending the feedback in response to one or more of: a periodic timer being reached; after each occurrence of a decision by the apparatus to perform narrow beam alignment; after a threshold number of decisions by the apparatus to perform narrow beam alignment.

According to some examples, the means comprises at least one processor; and at least one memory including computer program code, the at least one memory and computer program code configured to, with the at least one processor, cause the performance of the apparatus.

According to a second aspect there is provided an apparatus comprising at least one processor; and at least one memory including computer program code; the at least one memory and the computer program code configured to, with the at least one processor, cause the apparatus at least to perform: receiving one or more estimation models at the apparatus; determining an estimated time-of-stay of an antenna panel of the apparatus using the one or more estimation models, the time-of-stay comprising a duration for which the antenna panel is active for transmission and/or reception; and determining whether to perform a narrow beam alignment procedure for the apparatus based on the estimated time-of-stay.

According to a third aspect there is provided an apparatus comprising: circuitry for receiving one or more estimation models at the apparatus; circuitry for determining an estimated time-of-stay of an antenna panel of the apparatus using the one or more estimation models, the time-of-stay comprising a duration for which the antenna panel is active for transmission and/or reception; and determining whether to perform a narrow beam alignment procedure for the apparatus based on the estimated time-of-stay.

According to a fourth aspect there is provided a method comprising: receiving one or more estimation models at an apparatus; determining an estimated time-of-stay of an antenna panel of the apparatus using the one or more estimation models, the time-of-stay comprising a duration for which the antenna panel is active for transmission and/or reception; and determining whether to perform a narrow beam alignment procedure for the apparatus based on the estimated time-of-stay.

According to some examples the method comprises using the one or more estimation models for estimating the time-of-stay of the antenna for a given context.

According to some examples the given context comprises one or more of: a duration for which the apparatus is communicating with a base station beam; a duration for which the apparatus is in a cell; a duration for which the apparatus is in a geographical region.

According to some examples the method comprises selecting an estimation model to use from the received one or more estimation models.

According to some examples the method comprises selecting an estimation model having a finest level of granularity that the apparatus can support.

According to some examples the one or more estimation models are comprised in an information element received during radio resource control signalling.

According to some examples the method comprises receiving information of a mean expected duration of channel state information reference signal repetition bursts in a cell, and to use the information of mean expected duration of channel state information reference signal repetition bursts when determining whether to perform the narrow beam alignment procedure for the apparatus.

According to some examples the method comprises, in response to determining that the estimated time-of-stay meets or exceeds a threshold value, performing the narrow beam alignment procedure; or, in response to determining that the determined time-of-stay does not meet or exceed the threshold value, preventing performance of the narrow beam alignment procedure.

According to some examples the method comprises monitoring an actual time-of-stay of the antenna panel, and to send feedback of effectiveness of the received one or more estimation models based on a comparison between the predicted time of stay and the actual time of stay.

According to some examples the method comprises sending the feedback of effectiveness in an information element as part of radio resource control signalling.

According to some examples the method comprises sending the feedback in response to one or more of: a periodic timer being reached; after each occurrence of a decision by the apparatus to perform narrow beam alignment; after a threshold number of decisions by the apparatus to perform narrow beam alignment.

According to a fifth aspect there is provided a computer program comprising instructions for causing an apparatus to perform at least the following: receiving one or more estimation models at the apparatus; determining an estimated time-of-stay of an antenna panel of the apparatus using the one or more estimation models, the time-of-stay comprising a duration for which the antenna panel is active for transmission and/or reception; and determining whether to perform a narrow beam alignment procedure for the apparatus based on the estimated time-of-stay.

According to a sixth aspect there is provided a computer program comprising instructions stored thereon for performing at least the following: receiving one or more estimation models at an apparatus; determining an estimated time-of-stay of an antenna panel of the apparatus using the one or more estimation models, the time-of-stay comprising a duration for which the antenna panel is active for transmission and/or reception; and determining whether to perform a narrow beam alignment procedure for the apparatus based on the estimated time-of-stay According to a seventh aspect there is provided a non-transitory computer readable medium comprising program instructions for causing an apparatus to perform at least the following: receiving one or more estimation models at the apparatus; determining an estimated time-of-stay of an antenna panel of the apparatus using the one or more estimation models, the time-of-stay comprising a duration for which the antenna panel is active for transmission and/or reception; and determining whether to perform a narrow beam alignment procedure for the apparatus based on the estimated time-of-stay.

According to an eighth aspect there is provided a non-transitory computer readable medium comprising program instructions stored thereon for performing at least the following: receiving one or more estimation models at an apparatus; determining an estimated time-of-stay of an antenna panel of the apparatus using the one or more estimation models, the time-of-stay comprising a duration for which the antenna panel is active for transmission and/or reception; and determining whether to perform a narrow beam alignment procedure for the apparatus based on the estimated time-of-stay.

According to a ninth aspect there is provided an apparatus comprising means for performing: sending one or more estimation models to a user equipment, the one or more estimation models configured for enabling the user equipment to determine an estimated time-of-stay of an antenna panel of the user equipment, the time-of-stay comprising a duration for which the antenna panel is active for transmission and/or reception.

According to some examples the one or more estimation models sent to the user equipment are for a given context.

According to some examples the given context comprises one or more of: a duration for which the apparatus is communicating with a base station beam; a duration for which the apparatus is in a cell; a duration for which the apparatus is in a geographical region.

According to some examples the means are further configured to perform receiving feedback from the user equipment of the effectiveness of the one or more estimation models, and to store the feedback.

According to some examples the means are further configured to perform updating the one or more estimation models based on the received feedback.

According to some examples the means are further configured to perform sending the one or more estimation models to the user equipment in an information element during radio resource control signalling.

According to some examples the means are further configured to perform sending to the user equipment information of a mean expected duration of channel state information reference signal repetition bursts in a cell.

According to some examples the means are further configured to perform sending the one or more estimation models to the user equipment in response to determining one or more of: a handover of the user equipment; beam-switching; a location update.

According to a tenth aspect there is provided an apparatus comprising at least one processor; and at least one memory including computer program code; the at least one memory and the computer program code configured to, with the at least one processor, cause the apparatus at least to perform: sending one or more estimation models to a user equipment, the one or more estimation models configured for enabling the user equipment to determine an estimated time-of-stay of an antenna panel of the user equipment, the time-of-stay comprising a duration for which the antenna panel is active for transmission and/or reception.

According to an eleventh aspect there is provided an apparatus comprising: circuitry for sending one or more estimation models to a user equipment, the one or more estimation models configured for enabling the user equipment to determine an estimated time-of-stay of an antenna panel of the user equipment, the time-of-stay comprising a duration for which the antenna panel is active for transmission and/or reception.

According to a twelfth aspect there is provided a method comprising: sending one or more estimation models to a user equipment, the one or more estimation models configured for enabling the user equipment to determine an estimated time-of-stay of an antenna panel of the user equipment, the time-of-stay comprising a duration for which the antenna panel is active for transmission and/or reception.

According to some examples, the one or more estimation models sent to the user equipment are for a given context.

According to some examples, the given context comprises one or more of: a duration for which the apparatus is communicating with a base station beam; a duration for which the apparatus is in a cell; a duration for which the apparatus is in a geographical region.

According to some examples, the method comprises receiving feedback from the user equipment of the effectiveness of the one or more estimation models, and to store the feedback.

According to some examples, the method comprises updating the one or more estimation models based on the received feedback.

According to some examples, the method comprises sending the one or more estimation models to the user equipment in an information element during radio resource control signalling.

According to some examples, the method comprises sending to the user equipment information of a mean expected duration of channel state information reference signal repetition bursts in a cell.

According to some examples, the method comprises sending the one or more estimation models to the user equipment in response to determining one or more of: a handover of the user equipment; beam-switching; a location update.

According to a thirteenth aspect there is provided a computer program comprising instructions for causing an apparatus to perform at least the following: sending one or more estimation models to a user equipment, the one or more estimation models configured for enabling the user equipment to determine an estimated time-of-stay of an antenna panel of the user equipment, the time-of-stay comprising a duration for which the antenna panel is active for transmission and/or reception.

According to a fourteenth aspect there is provided a computer program comprising instructions stored thereon for performing at least the following: sending one or more estimation models to a user equipment, the one or more estimation models configured for enabling the user equipment to determine an estimated time-of-stay of an antenna panel of the user equipment, the time-of-stay comprising a duration for which the antenna panel is active for transmission and/or reception.

According to a fifteenth aspect there is provided a non-transitory computer readable medium comprising program instructions for causing an apparatus to perform at least the following: sending one or more estimation models to a user equipment, the one or more estimation models configured for enabling the user equipment to determine an estimated time-of-stay of an antenna panel of the user equipment, the time-of-stay comprising a duration for which the antenna panel is active for transmission and/or reception.

According to a sixteenth aspect there is provided a non-transitory computer readable medium comprising program instructions stored thereon for performing at least the following: sending one or more estimation models to a user equipment, the one or more estimation models configured for enabling the user equipment to determine an estimated time-of-stay of an antenna panel of the user equipment, the time-of-stay comprising a duration for which the antenna panel is active for transmission and/or reception.

BRIEF DESCRIPTION OF FIGURES

The invention will now be described in further detail, by way of example only, with reference to the following examples and accompanying drawings, in which:

FIG. 14 is a flow-chart of a method according to an example;

FIG. 19 is a flow-chart of a method according to an example;

FIG. 20 is a flow-chart of a method according to an example; FIG. 21 shows a schematic representation of non-volatile memory media.

DETAILED DESCRIPTION

Figure 1:
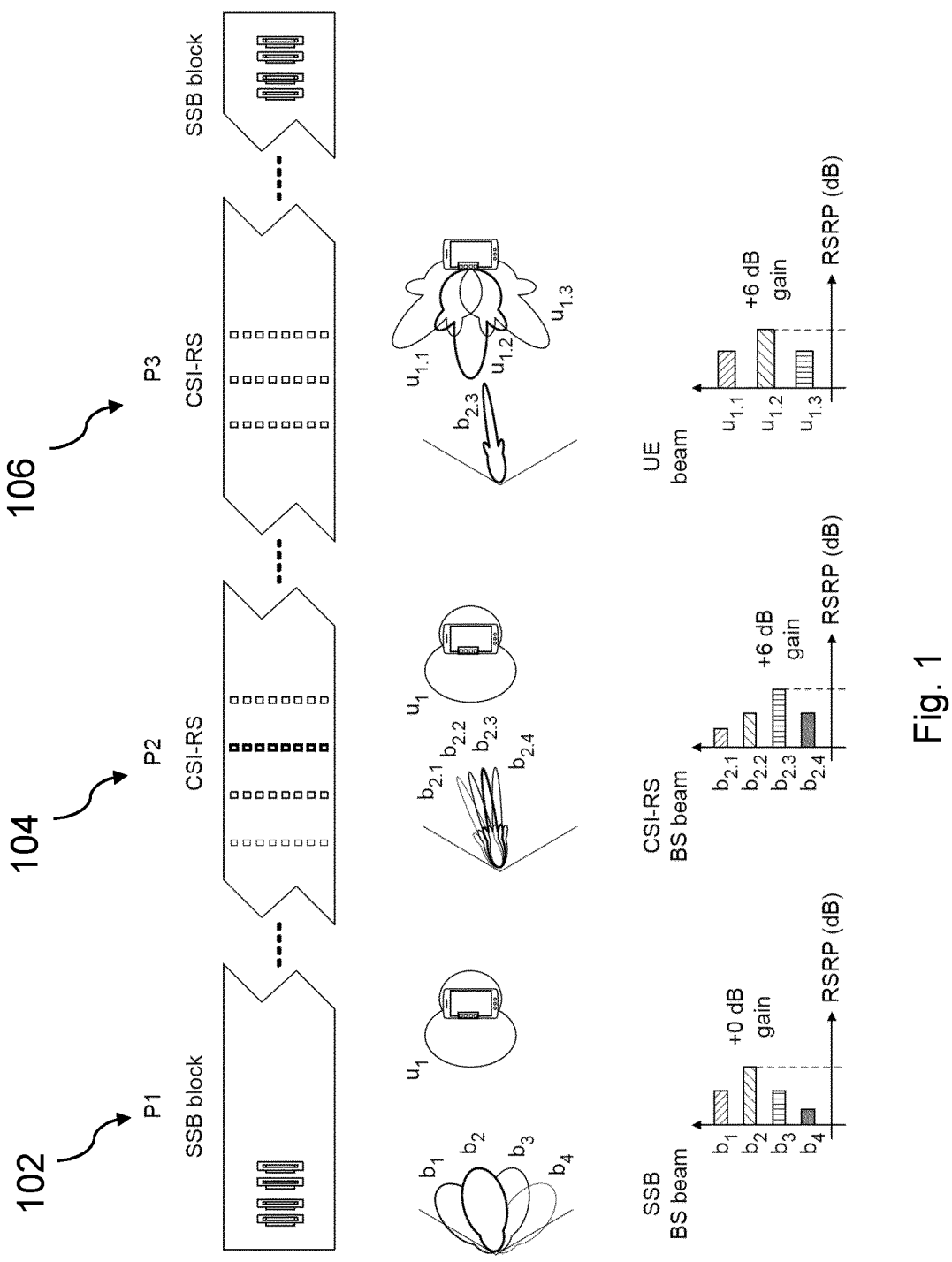
FIG. 1 schematically shows examples of gains from different beam alignment procedures.
Figure 2:
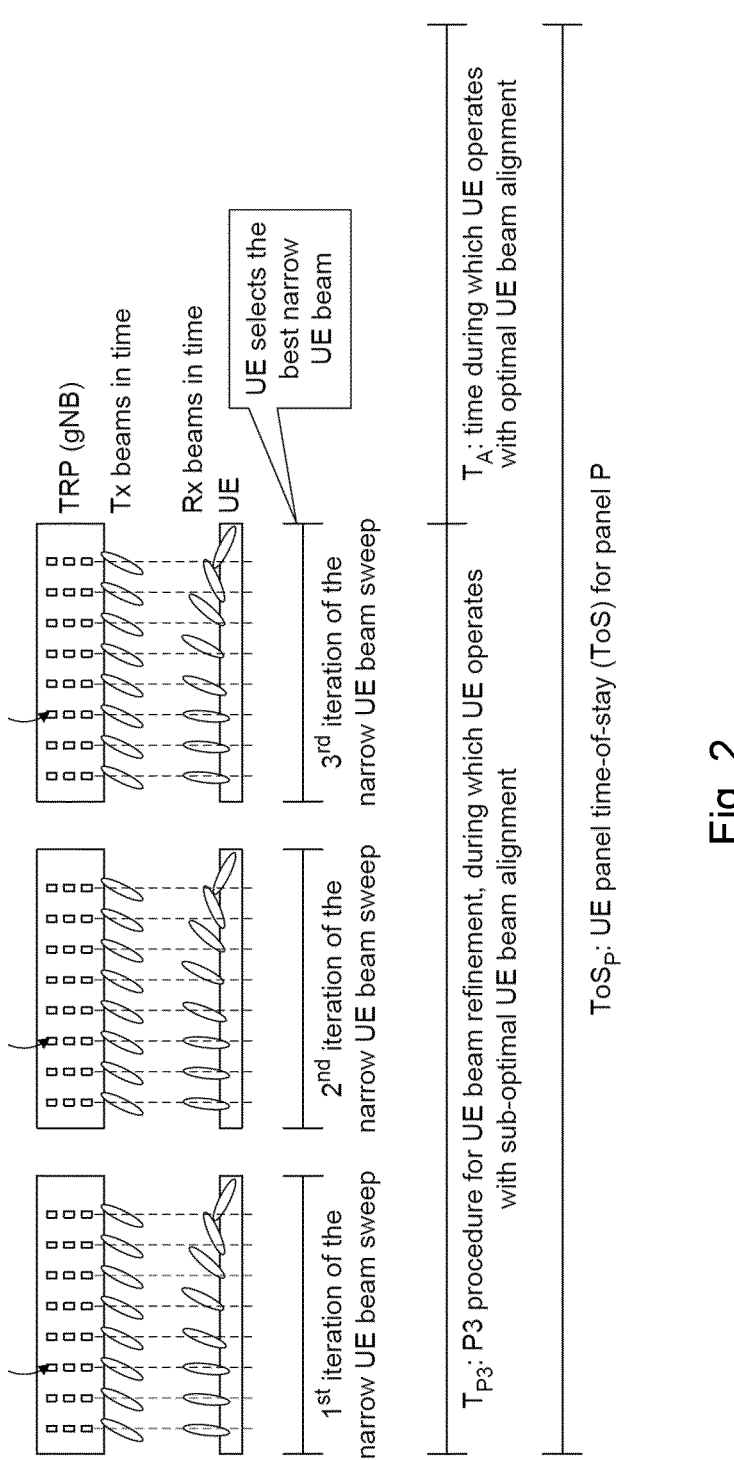
FIG. 2 shows a timing relationship for execution of a beam alignment procedure.

5G NR is a beam-based radio access network, meaning that beamforming and beam management procedures permeate all aspects of regular 5G NR operation, from the initial access to the regular intra- and inter-cell mobility. Hence, beamforming and the supporting beam management procedures are a 5G NR building block. According to 3GPP specs, there are three major procedures for beam selection and beam refinement:

1) SSB Beam Selection: also known as "P1 procedure", is a procedure taken by the UE to measure all individual wide SSB (synchronization signal block) beams transmitted within an SSB sweep while in a SSB Burst transmitted by a base station (gNB). The UE then decides which wide SSB beam is the best (e.g. higher reference signal received power (RSRP)) and then initiates the initial access procedure on that wide SSB beam;

2) BS Beam Refinement: also known as "P2 procedure", is a procedure for further refining the serving BS beam selected during the P1 procedure, usually conducted by transmitting a sequence of CSI-RSs (channel state information reference signals) over the narrow beams that are quasi-co-located (QCL) with the wide SSB beam, then deciding the N best narrow CSI-RS beams (e.g. higher RSRPs), reporting the N best beams to gNB via TRP (transmission/reception point) report, then the gNB selects the new serving BS beam, and finally the gNB informs the new serving BS beam to the UE via DCI (downlink control information) signaling indicating the new TCI (transmission configuration indicator) state to be used. A relevance of P2 procedure is that by properly selecting the narrow BS beam the link between the gNB and the UE might benefit from up to 6 dB just from properly selecting the best-aligned BS beam;

3) UE Beam Alignment: also known as P3 procedure, is a procedure taken by the gNB to send a sequence of aperiodic CSI-RS repetitions over the current serving BS beam, and then also at the UE side for sweeping over its own narrow UE beams to determine which of these are best-aligned with the current serving BS beam, until the UE finally chooses the best narrow UE beam (e.g. highest RSRP). The assumption that the narrow UE beam alignment execution is a UE decision is a notable 3GPP assumption. A relevance of P3 procedure is that by properly selecting the narrow UE beam using the burst of aperiodic CSI-RS repetitions, the link between the gNB and the UE might benefit from up to 6 dB just from properly selecting the best-aligned UE beam right when this is needed, and this is on top of whatever gains were obtained from P2 procedure;

A UE antenna will typically comprise a plurality of panels or elements for receiving and/or transmitting information. In use, a UE can switch between which panel is being used, for example dependent upon one or more criteria, to try to ensure optimum reception and/or transmission at any given time. In some examples, the panel comprises a chip. The chip comprises an antenna array that is connected to a set of RF components. Therefore in some examples it may be considered that the panel comprises an antenna array. An aim of the panel(s) is to create a steerable antenna radiation pattern. In some examples, the panel is polarized, meaning that the panel has two antenna arrays (one in vertical polarization and the other in horizontal polarization). In some examples, each antenna element is connected to a Power Amplifier (PA) for uplink signal, and a Low Noise Amplifier (LNA) for downlink signal. The amplifiers are then connected to phase shifters. In examples, the PA/LNA and phase-shifters are controlled digitally from baseband chip to steer the radiation pattern of the panel in the desired direction.

An illustration is provided of the three beam selection procedures (P1, P2 and P3) in Error! Reference source not found. The P1 procedure is schematically shown at 102, the P2 procedure is schematically shown at 104, and the P3 procedure is schematically shown at 106. It can be seen that in order for the link between the gNB and the UE to properly benefit from the beam alignment gains (e.g. up to 12 dB in the example provided), the P2 and P3 procedures must be continuously conducted. In the case of the P2 procedure, the gNB might send a sequence of aperiodic CSI-RSs over the quasi-co-located (QCL) narrow beams for the UEs to execute their P2 procedure right after the execution of P1 procedure, or periodically so as to deal not io only with the UE mobility but also changes in the environment (e.g. an incoming blocker) that might affect the link. In the case of the P3 procedure, the gNB might send a burst of aperiodic CSI-RS repetitions over the current serving BS beam for a given UE to execute its P3 procedure (a) right after the execution of P2 procedure, (b) periodically so as to deal not only with the UE mobility but also changes in the environment, and finally (c) whenever there is a change in the UE panel currently selected. Of note is that while P1 and P2 procedures are controlled by the gNB, it is up to the UE to decide when and how to conduct narrow UE beam alignment based on the P3 procedure. As 5G NR operation moves beyond FR2 (frequency range 2) and the number of UE panels and of panel elements per UE panel increases, the number of UE beams that need to be swept increases, and it can be expected that the gains from accurate BS beam and UE beam alignment could go up to e.g. 24 dB, hence making the timely and efficient execution of P2 and P3 procedures extremely relevant.

An aim for 5G NR for operation in FR2 and beyond is benefitting the most from the highest possible gains from having the best base station (BS) beam and best UE beam correctly aligned. For that to occur, the P3 procedure for narrow UE beam alignment is typically executed (a) right after every BS beam switch, and/or (b) right after every UE panel switch. It can be assumed that the base station (gNB) would trigger a P3 procedure after the execution of the P2 procedure for BS beam refinement, as for every BS beam switch a new UE beam alignment is necessary. However, for the case of narrow UE beam alignment after a UE panel switch, the gNB has no means to quickly become aware (as per current 3GPP specs) that the UE has switched UE panels.

A UE could notify the gNB about the need for the burst of aperiodic CSI-RS repetition to be triggered, which could be invoked right after the UE panel switch, allowing the gNB to quickly transmit the burst of aperiodic CSI-RS repetition in support for the narrow UE beam alignment within 10 ms-20 ms time.

If this is not used, the gNB has a lack of knowledge on timing of UE panel switches. In this case, the gNB could implement a "blind" strategy of smartly estimating when the UE has switched panels through other indirect means, but then there would be non-zero probabilities for false positives (i.e. the gNB infers there was a UE panel switch but there wasn't any at all), in which case the burst of aperiodic CSI-RS repetitions would be unnecessarily decreasing spectral efficiency due to overhead, and/or false negatives (i.e. the gNB does not detect an incoming UE panel switch), in which case the required narrow UE beam alignment could not be completed after a UE panel switch due to the lack of CSI-RS repetitions to support its quick execution. Because of this lack of knowledge at the gNB of when exactly the UE has switched panels, the network cannot benefit from the optimal scenario of the gNB transmission of a burst of aperiodic CSI-RS repetitions for the serving BS beam immediately after the UE antenna panels have been switched.

Another "blind" strategy for the gNB regarding triggering the transmission of a burst of aperiodic CSI-RS repetition in support for efficient narrow UE beam alignment could be for the gNB to trigger the transmission of periodic/semi-persistent CSI-RS repetitions of the serving BS beam whenever it selects a new serving BS beam, hence provisioning the UE with the necessary CSI-RS repetition for the UE to execute the narrow UE beam sweeping. However, any CSI-RS periodic or semi-persistent transmission should occur with a minimal periodicity of e.g. 10 ms for 120 kHz SCS (subcarrier spacing). Assuming the UE has eight narrow UE beams per panel that need to be swept for the narrow UE beam alignment, this would mean that a single narrow UE beam sweep takes 80 ms to be executed, and with the realistic assumption that some sort of L1 filtering is implemented, this mean this 80 ms interval needs to be multiplied by 2 or 3 for the L1 filtering to occur. This might extend the duration of the whole procedure to up to 240 ms when based on periodic/semi-persistent CSI-RS.

Error! Reference source not found. provides an overview of a timing relationship for execution of a P3 procedure regarding a UE panel time-of-stay (ToS). ToS may be considered a duration for which a UE antenna panel is active in receiving and/or transmitting information and/or data. For example, a UE antenna may have a plurality of panels, and during use the UE will switch antenna panels dependent on which panel is considered optimal at that point in time (e.g. because it has the strongest signal). The duration for which a particular antenna panel is active is its ToS. According to some examples "active" means any one or more of: active reception; active transmission; active reception and transmission. The ToS may be associated with one or more different contexts or situations. For example ToS of a panel may be (by way of non-limiting examples) any one or more of a time for which that panel is active in transmitting and/or receiving information with any one or more of: a cell; a base station beam; a geographical region, etc. Assuming a worst-case scenario where the best narrow UE beam is the last in the narrow UE beam sweeping, and assuming three iterations of the narrow UE beam sweeping procedure for L1 filtering, there could be a time $T_{P3}$ of at least 240 ms. In an optimistic scenario where the best narrow UE beam would be the first in the narrow UE beam sweeping this could be reduced to at least 170 ms in the case of 3 iterations for L1 filtering (or even 90 ms in the case of only 2 iterations for L1 filtering). Hence, the minimal time $T_{P3}$ varies between 170 ms and 240 ms, which could easily increase in case the gNB has to do the same for multiple UEs. Also, the issue of spatial scheduling restrictions impose a longer period between two consecutive CSI-RS repetitions.

No narrow UE beam alignment will be efficient if (a) the gNB does not provision the UE with a burst of CS-RS repetitions over the serving BS beam, and (b) the UE stays sufficiently long enough on the same UE panel not only for the execution of the narrow UE beam alignment itself but also for benefitting from the additional link gains for data transmission. While for (a) the gNB can trigger the CSI-RS repetition right after P2 and/or periodically, the determination of UE panel time-of-stay (ToS) for (b) cannot be determined beforehand, because of both external factors (e.g. an incoming blocker in the link path) and internal factors (e.g. a user putting their hand on top of the currently selected UE panel). As such, one problem for proper narrow UE beam alignment can occur if the UE prematurely needs to switch UE panels before concluding the narrow UE beam alignment. If, for instance, the UE decides to execute the P3 procedure and requests to the gNB the transmission of the CSI-RS repetition, it might be that the UE panel need to be switched abruptly in the middle of the CSI-RS repetition, hence both data transmissions were unnecessarily delayed and cell spectral efficiency was unnecessarily decreased due to the increase in signaling overhead with the CSI-RS repetition that was not efficient in enabling narrow UE beam alignment. On the other hand, if the UE decides not to execute the narrow UE beam alignment but eventually stays long enough on the same UE panel (i.e. enough for executing the P3 procedure and still have remaining time to benefit from the additional UE beamforming gains), then this would be a missed opportunity that also represents a decrease in cell spectral efficiency.

Figure 3:
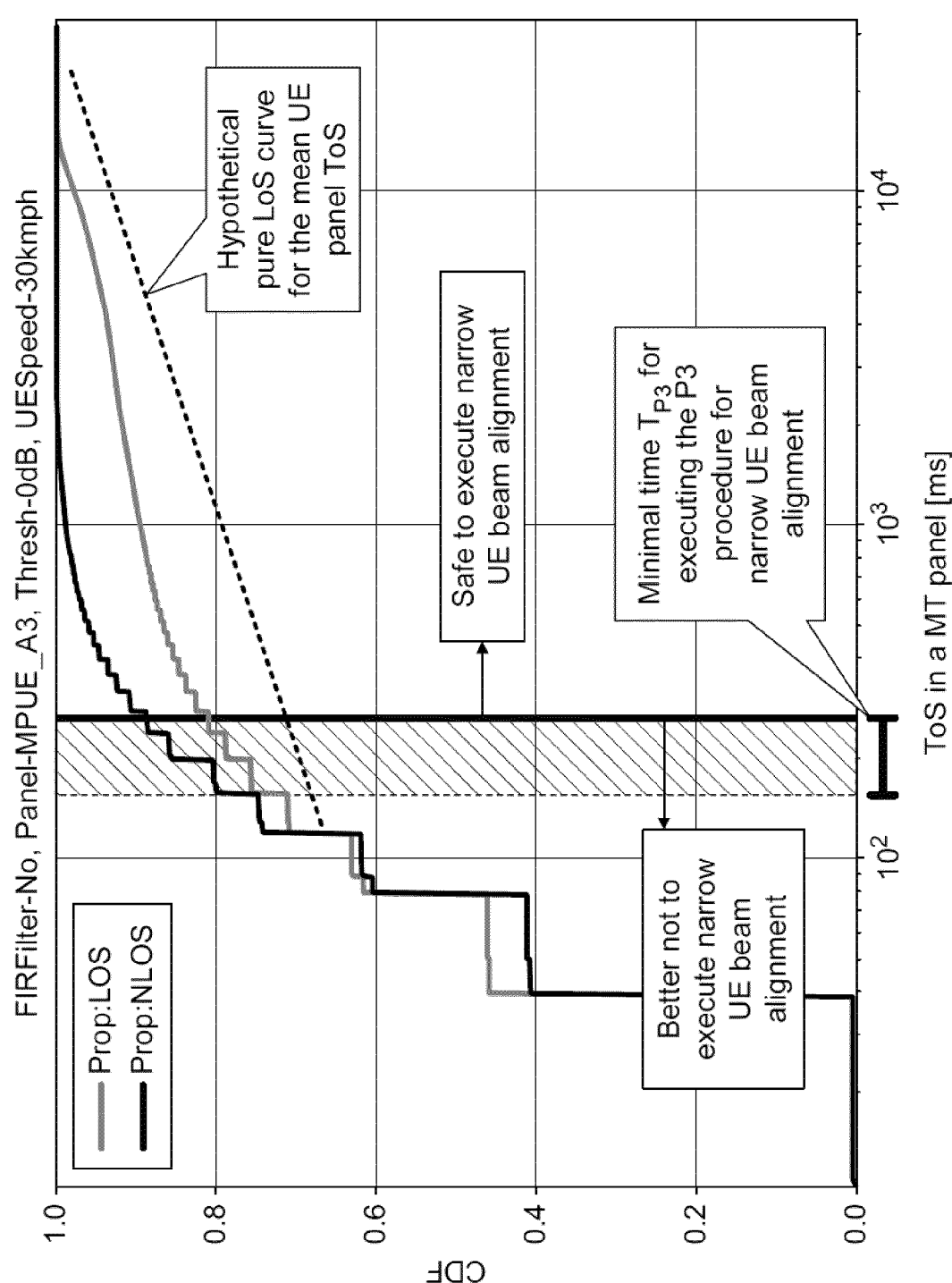
FIG. 3 is a graph illustrating time of stay of an antenna panel.
Figure 4:
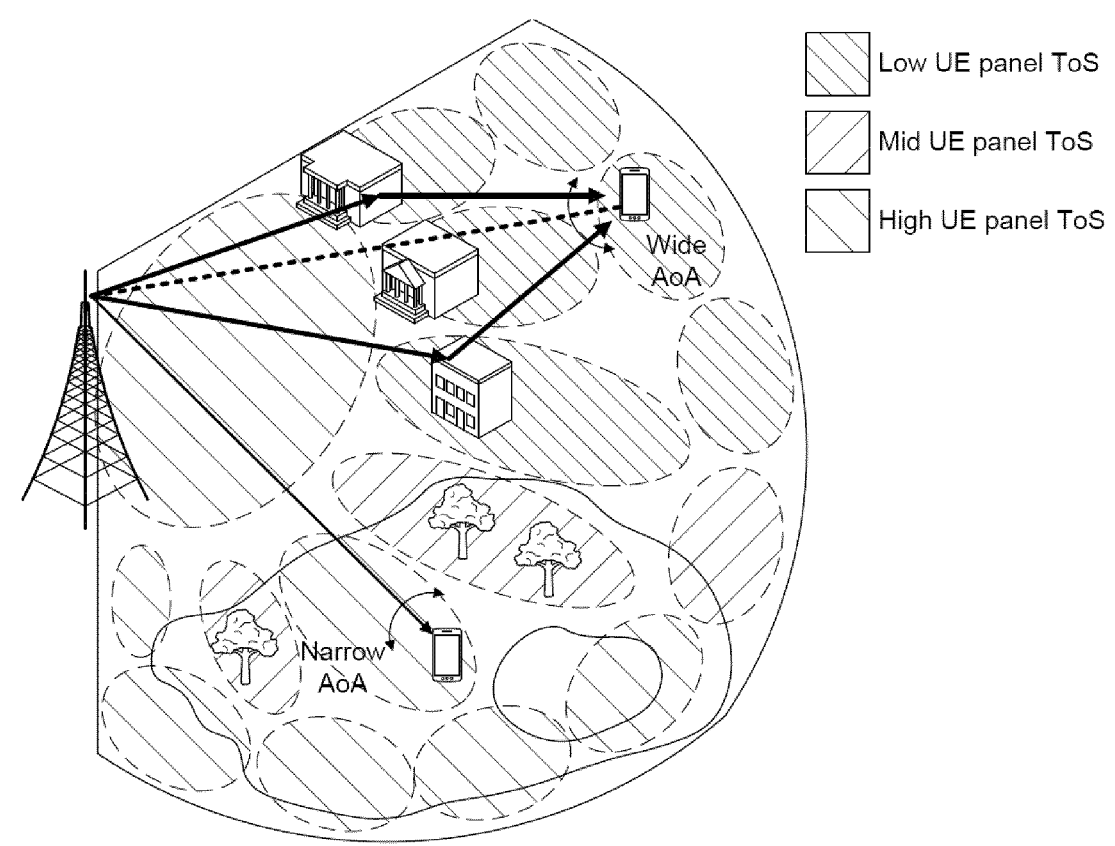
FIG. 4 schematically illustrates UE panel ToS based on propagation characteristics.

Further considerations on this problem are based on results for the cumulative distribution function (CDF) for the UE panel ToS, which were obtained from a simulation of a 21-cell Urban Macro (UMa). See for example 3GPP TR 38.901. This assumed a gNB beamset of 14 BS beams over the 120° width of each sector, and omni-directional UEs with 4 panels pointed at 0°, 90°, 180° and 270° respectively. In this scenario, the UEs are moving in straight lines, executing regular cell mobility and beam mobility procedures as they move across boundaries of cells and BS beams, respectively. Different simulations were executed for line-of-sight (LOS) and non-line-of-sight (NLOS) propagation conditions, with different angular spreads depending on the distance to the gNB (SoftLOS). As shown in FIG. 3, for this scenario most of the time the UE panel ToS is actually below the minimal time for $T_{P3}$ (hatched area), for both LOS and NLOS conditions in the case of periodic/semi-persistent CSI-RS repetition, in which case the UE would better off not to execute the narrow UE beam alignment (as it would be unconcluded due to a UE panel switch). Only for 18% of time in LOS conditions and 12% of time in NLOS conditions the UE can actually stay long enough at the UE panel to minimally execute the P3 procedure. In a case where the UE requests an aperiodic CSI-RS repetition burst to the gNB lasting between 10 ms and 20 ms, then most of the time the UE would be able to benefit from sufficient UE panel ToS to not only execute the P3 procedure, but also from data transmissions using properly aligned narrow UE beams. The UE panel ToS may vary in orders of magnitude not only for the same propagation conditions (e.g. due to the geometry of the gNB-UE distance and gNB and UE orientations) but also when the propagation conditions are varied (i.e. LOS vs. NLOS). Considering the UMa (Urban Macro) LOS still has a non-zero angular spread, also shown with a dashed line is a hypothetical pure LoS curve for the UE panel ToS. This hypothetical situation could arise for example in open fields, and hence further increase the UE panel ToS variability when considering different propagation conditions.

An illustration of how this variability in UE panel ToS could come from propagation characteristics is shown in Error! Reference source not found. As shown, in cases where the UE has direct LOS propagation conditions to the cell (e.g. in the middle of the open space in the park area), the angle-of-arrival (AoA) would be narrow, and hence the angular spread would be minimal. On the other hand, in cases where the UE doesn't have direct LOS propagation conditions, like behind the buildings at the top of the cell edge, the AoA would be wide due to transmission reflections from nearby buildings, and hence the angular spread could be large. Regardless of LOS and NLOS propagation conditions, as long as the UE has, say, at least 25% of the received power within the main lobe width, it is still worth using a narrow UE beam because the UE can benefit from the additional gains in comparison to the case where it simply uses a wide UE beam instead. As such, even for NLOS conditions the execution of the narrow UE beam alignment with the support of a burst of aperiodic CSI-RS repetition is justifiable due to the potential from benefitting from the additional gains of narrow UE beam alignment.

Therefore, the present disclosure has identified that:

If a UE had means or was arranged to determine theoretically or a priori that the mean ToS in a given antenna panel at a given specific cell location and/or BS beam is statistically high enough for narrow UE beam alignment, then it is worthwhile for the UE to execute the narrow UE beam alignment (positive case). Different settings could be considered based on UE angular speeds.

On the other hand, if the UE had means or was arranged to determine theoretically or a priori that the mean ToS in a given UE panel at a given specific cell location and/or BS beam is low, then in fact the UE would be better not to execute any narrow UE beam alignment, and hence avoid triggering it and remain with a wide UE beam (negative case).

In other words, the present disclosure realises that UE panel ToS is a relevant piece of information that the gNB has no control over whatsoever. A UE may decide based upon external factors e.g. an incoming blocker or a user's hand switching positions on their UE, regardless of the execution or not of narrow UE beam alignment. Both false positive and false negative cases can significantly decrease both cell-wide spectral efficiency and user-specific performance. Also, the ToS for a given UE panel is related to the angular speed, i.e. how fast serving BS beams are being switched, as there might be UE panel switches caused not by the propagation conditions but by changes in the best UE panel to use for a new serving BS beam that has just been switched to.

With these problems in mind, according to some examples there is provided a user equipment which can receive one or more estimation models, for example from a base station. The user equipment can use the one or more estimation models to determine an estimated time of stay of an antenna panel of the apparatus in a given situation. Based on the estimated time of stay determined by the UE, the UE can determine whether or not to perform a narrow beam alignment procedure.

In examples, the UE is configured to use the one or more estimation models to estimate the time-of-stay of the antenna panel for a given context. For example the given context may comprise one or more of: time of stay of the antenna panel with a cell; time of stay of the antenna panel in a geographical region; time of stay of the antenna panel with a particular base station. Therefore, in some examples the term "estimation model" may also be referred to as a "contextual model", because the one or more estimation models enable estimation of time of stay in different contexts. In some examples, each estimation model may be for a particular context. In some examples, one or more of the models may be capable of enabling the UE to determine ToS for a number of contexts.

The present disclosure also relates to corresponding activities on the base station side. For example, the present disclosure also relates to a base station which can send one or more estimation models to a user equipment, the one or more estimation models being configured for enabling a user equipment to determine an estimated time of stay of an antenna panel of the user equipment.

Thus it will be understood that the estimation model (which can be cell-wide, beam-wide, location wide, etc.) for the UE panel ToS is a relevant piece of information that can trigger an increase in cell spectral efficiency due to narrow UE beam alignment. Currently, the gNB does not provision the UE with any estimation model/information which allows the UE to determine the ToS for a UE panel.

Therefore, in summary, and as will be discussed in more detail below, the present disclosure discloses:

1. A method and over-the-air signaling for gNB to provision the UE with an estimation model of the UE panel ToS. The estimation model can be used by the UE for determining whether or not it is worthwhile triggering a narrow UE beam alignment procedure.

2. A method for the UE to utilize the provisioned estimation model on the UE panel ToS to determine whether it is worth conducting the narrow UE beam alignment to choose the best UE narrow beam or, instead, it will be better to remain using a wide UE beam;

3. A method and over-the-air signaling for the UE to report feedback to the gNB about the effectiveness of the gNB-provisioned estimation model of the UE panel ToS. The feedback can be used by the gNB to further enhance the estimation model on the UE panel ToS.

Thus, gNBs are provided with a mechanism to increase effectiveness of the transmission of CSI-RS repetition bursts (i.e. by avoiding transmission when there will be no use due to early UE panel switches). The gNB is also provided with a mechanism to increase spectral efficiency (i.e. by allowing UEs to determine a priori whether the UE panel ToS will be enough to trigger narrow UE beam alignment).

Figure 5:
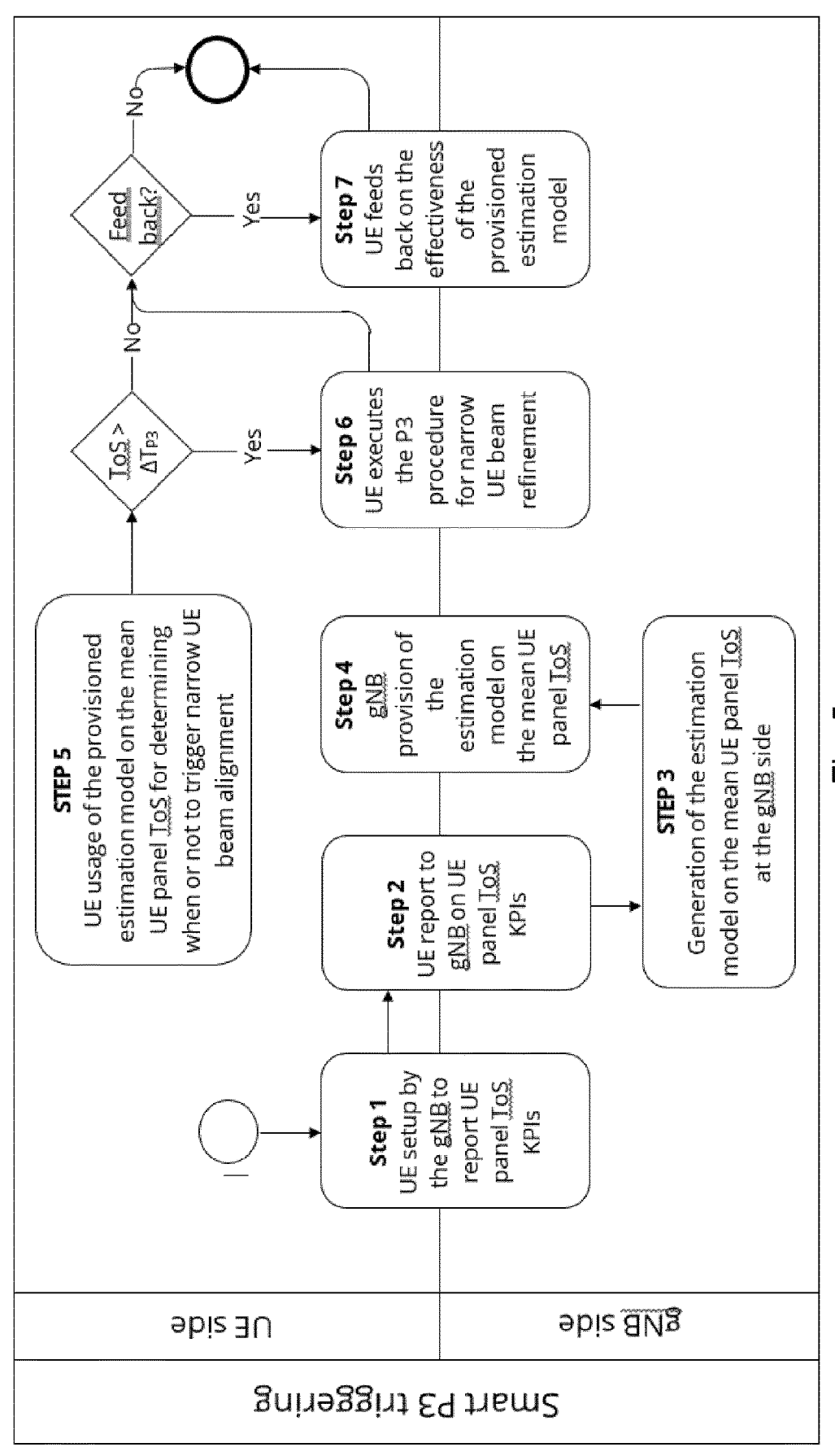
FIG. 5 is a flow-chart of a method according to an example.

FIG. 5 schematically shows the overall concept. The overall steps of the concept are:

Step 1

UE informs the gNB that the UE supports (a) the provisioning of estimation models for the UE panel ToS; and (b) the transmission of feedback to gNB about the effectiveness of the provisioned estimation model for UE panel ToS. Then, the gNB configures the UE to periodically report UE antenna panel-related information. For example the panel-related information may be information such as UE panel switch key performance indicators (KPIs). For example the KPIs may include average(e.g. mean) ToS of a UE panel; number of panel switches per BS beam, etc. The UE may also provide relevant contextual information for the creation of the estimation models. For example the UE may provide contextual information such as cell ID (e.g. the cell ID for the cell the UE is currently associated with); BS beam ID (e.g. the beam ID for the gNB beam that is currently selected by the gNB as the serving gNB beam for the UE); UE beam ID (e.g. the beam ID for the UE beam that is currently selected by the UE as the serving UE beam); UE panel ID (e.g. antenna panel ID for the UE antenna panel currently selected as the active UE antenna panel); distance to the cell (e.g. distance of the UE from the BS); exact GPS location; time of day; etc.

Step 2

The UE collects and reports to the gNB the UE antenna panel ToS KPIs. The gNB then stores locally the received reports from all UEs, for later usage.

Step 3

The estimation model for the UE panel ToS is generated at the gNB-side.

Step 4

The gNB provisions the UE with the estimation model for UE panel ToS. For example the estimation model may be sent via an information element (IE) transmitted within RRC signaling (RRC Setup/RRC Reconfiguration/RRC Release). In examples, the UE stores the provisioned estimation model for UE panel ToS locally, for later use. Optionally, the gNB may also inform the UE of (a) the mean expected duration of the CSI-RS repetition bursts in the area of the UE. Optionally, the gNB may inform the UE (b) whether or not the UE is expected to provide feedback on the effectiveness of the provisioned estimation model for the UE panel ToS.

It will be understood that in some examples a gNB may provision a number of UEs with the described estimation models. In some examples, a gNB may provision each UE with one or more estimation models. That is, in some examples, a gNB may provision a UE with a plurality of estimation models. In some examples, each estimation model that is provided is for a different ToS context e.g. cell-wide; beam-wide; area-wide etc. The UE can then select the most appropriate estimation model required at a given time. Or, in some cases, a single model may enable a UE to make ToS estimations for a number of contexts. Whichever way the one or more estimation model(s) are provisioned to the UE, it will be understood that the UE is then provisioned with information enabling the UE to make UE panel ToS estimations for a plurality of antenna panel contexts of the UE (e.g. cell-wide; beam wide; area-wide) etc. In other words, the gNB may provide the UE with estimation models with different contextual scopes, e.g. cell-wide and beam-wide, and depending on the contextual information available at hand the UE then can decide which of these estimation models is most suitable to be used.

In terms of feature (a), informing the UE of the mean expected duration of the CSI-RS repetition bursts in the area of the UE, its relevance is at least in part as follows. An advantage of enabling the UE to make estimations on the UE panel ToS, is that the UE is then able to use that information to decide whether to proceed and attempt a P3/UE beam alignment procedure or not. If the UE panel ToS is shorter than the duration of that P3 procedure, then it is not worthwhile the UE carrying out the P3 procedure and the UE could continue using a wide UE beam. Otherwise, if the UE panel ToS is greater than the duration of the P3 procedure, then it is worth the UE using the P3 procedure so that it can then continue using the narrower UE beam. In some examples, the most efficient way for the UE to execute the P3 procedure for UE beam refinement is through an aperiodic burst of CSI-RS transmissions over the serving gNB beam from the gNB. For this, knowing the mean expected duration of CSI-RS repetition bursts is relevant for the UE to determine whether the predicted UE panel ToS will be sufficient for the execution of the P3 procedure.

Step 5

The UE then utilizes the locally stored gNB-provisioned estimation model for UE panel ToS, to determine whether or not it is worthwhile executing the narrow UE beam alignment.

Step 6

The UE performs the narrow UE beam alignment procedure, when it is determined in step 5 that it is worth performing the narrow UE beam alignment procedure, based on the gNB-provisioned estimation model for the UE panel ToS.

Step 7

In some examples, the UE monitors the outcome of the estimation, i.e. whether the estimated UE panel ToS remains valid and/or was useful for determining narrow UE beam alignment triggering. In some examples, the UE does this by comparing the estimated ToS with an actual recorded ToS. In examples, the UE does this for later UE feedback transmission to the gNB. In examples, periodically the UE transmits this information to the gNB. For example, the UE may provide the feedback in an information element transmitted within RRC signaling (e.g. RRM Measurement Report). The gNB then receives the UE feedback. The gNB can then store the feedback and use it for later processing and improvement of the gNB-provisioned UE panel ToS.

It will be understood that in any given cell, the estimation model (whether that is cell-wide, beam-wide, location wide, etc.) can be used by the UE to determine or classify whether a given UE panel ToS is large-enough for the execution of the narrow UE beam alignment, or not.

As can be seen with reference back to Error! Reference source not found, one can use the narrow angle-of-arrival (AoA) due to the existence of direct line-of-sight (LOS) as an indication of an expected high value for the UE panel ToS. On the other hand, the wide AoA due to the existence of blockers like buildings for the LOS path and/or reflectors like buildings for the NLOS paths can be used as indicators of an expected low value for the UE panel ToS. In the example shown in Error! Reference source not found, the scope of this classification is beam-wide, but in other examples different ways to provide the degree of localization can be provided. For example, the degree of localization could be (by way of non-limiting example) any one or more of: cell-wide UE panel ToS classification; beam-wide classification; a mix of distance-wide and beam-wide classification; region classification (e.g. geo-fenced). The degree of localization may also be considered a degree or level of granularity. In some examples, the UE is configured to select an estimation model that has the finest level of granularity that the UE can support at that time. That is, in examples the UE is configured to select the estimation model that will provide the most accurate result considering the information that the UE has at its disposal. For example, the levels of granularity may be (with finest granularity first) (i) beam-wide, (ii) cell-wide, (iii) geographical area wide. In examples the UE is configured to use the estimation model having the finest level of granularity, so long as the UE has the necessary information supporting that level of granularity. Say for example the UE has only cell-wide and geographical area wide information at the UE's disposal. In that instance, the UE will use (ii) the cell-wide estimation model, being the finest level of granularity that the UE can support at that time. Any of these alternatives may be used to classify the UE panel ToS to support the narrow UE beam alignment procedure. In examples, which estimation model is used, and accordingly which level of granularity is used, may depend on any one or more of: (a) the spatial distribution of blockers and reflectors in the environment; (b) the BS beamset; (c) the UE panel configuration and UE beamset; and (d) the UE mobility pattern.

In examples, once a given estimation model is constructed by gNB, the estimation model may be continuously updated.

Figure 6:
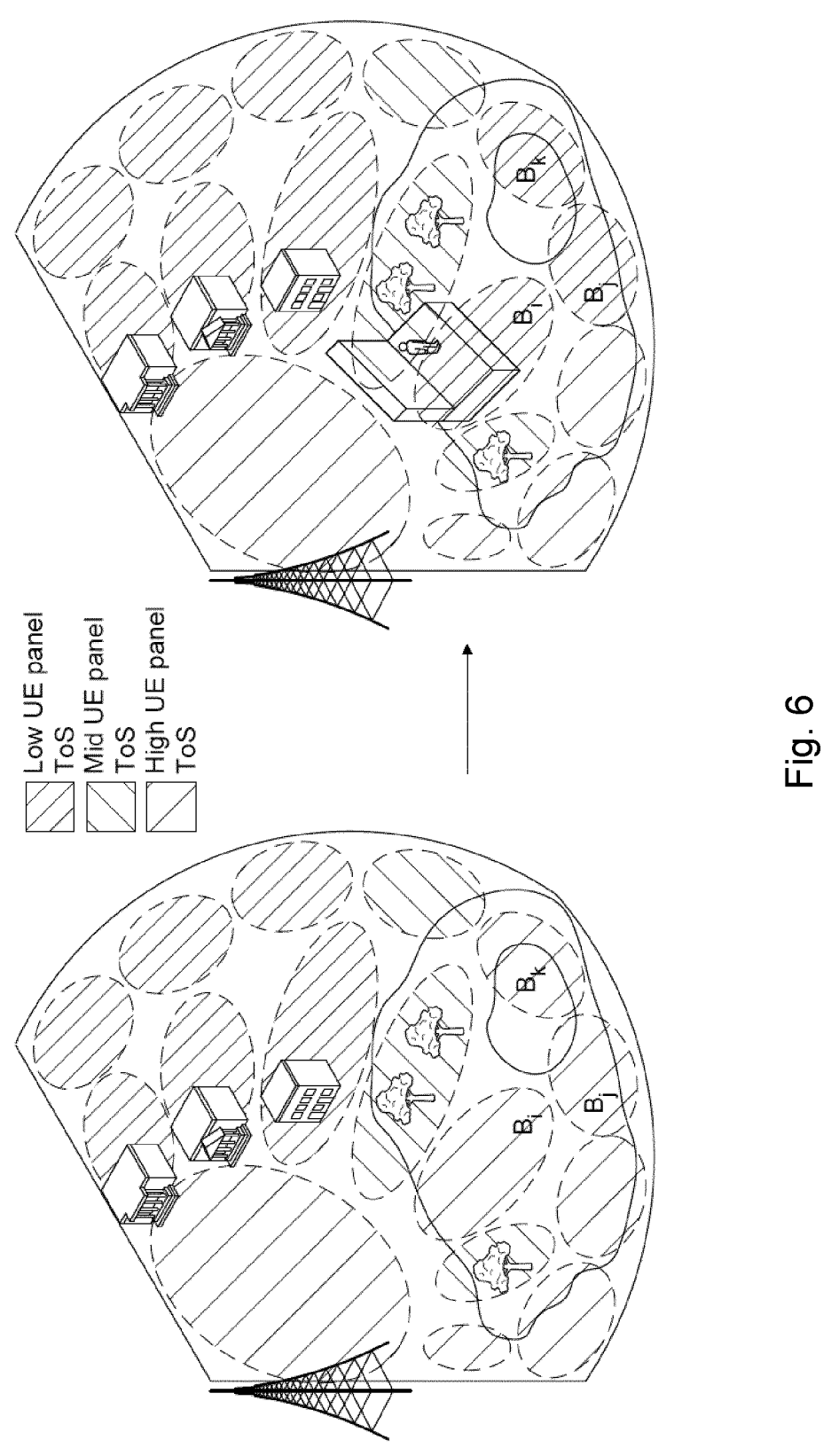
FIG. 6 schematically shows a case of addition of a blocker in a network scenario.
Figure 7:
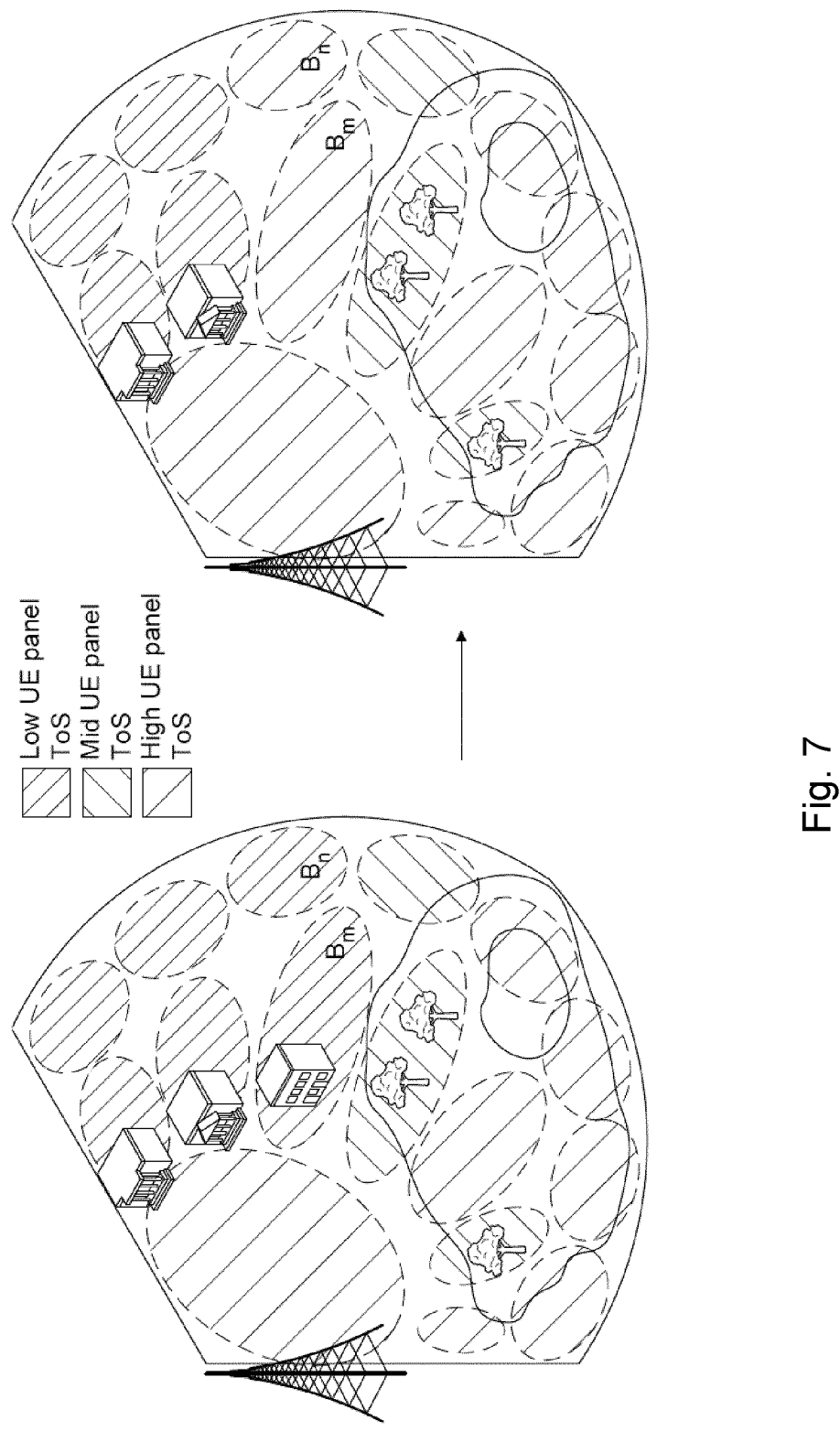
FIG. 7 schematically shows a case of removal of a blocker in a network scenario.

For instance, beams previously identified as having high UE panel ToS due to e.g. low AOA spread due to LOS propagation conditions (e.g. beams Bi, Bj and Bk in Error! Reference source not found.), may need to be re-classified due to e.g. the construction of a concert stage for a two-week festival (see right hand side of FIG. 6), during which time having those beams classified as having high UE panel ToS might cause a large number of P3 procedures being triggered unnecessarily. The opposite might also occur, e.g. when a previously-existing large scale blocker, such as a building, is demolished, and beams previously identified as having low UE panel ToS due to e.g. high AOA spread due to NLOS propagation conditions (beams $B_m$ and $B_n$ in Error! Reference source not found.). In such cases UEs would use the previous classification as a low UE panel ToS for the beam to unnecessarily remain with wide UE beams when they could be executing P3 procedures to switch to narrower UE beams. In other words, the one or more estimation models may be updated at the gNB to account for changing conditions. In some examples, the conditions may be physical conditions. The physical conditions may comprise an updated presence or absence of a blocker such as a building or structure.

Each of steps 1 to 7 of FIG. 5 will now be described in more detail below. Some sub-steps are further explained with additional Figures.

Step 1—Further Detail

Figure 8:
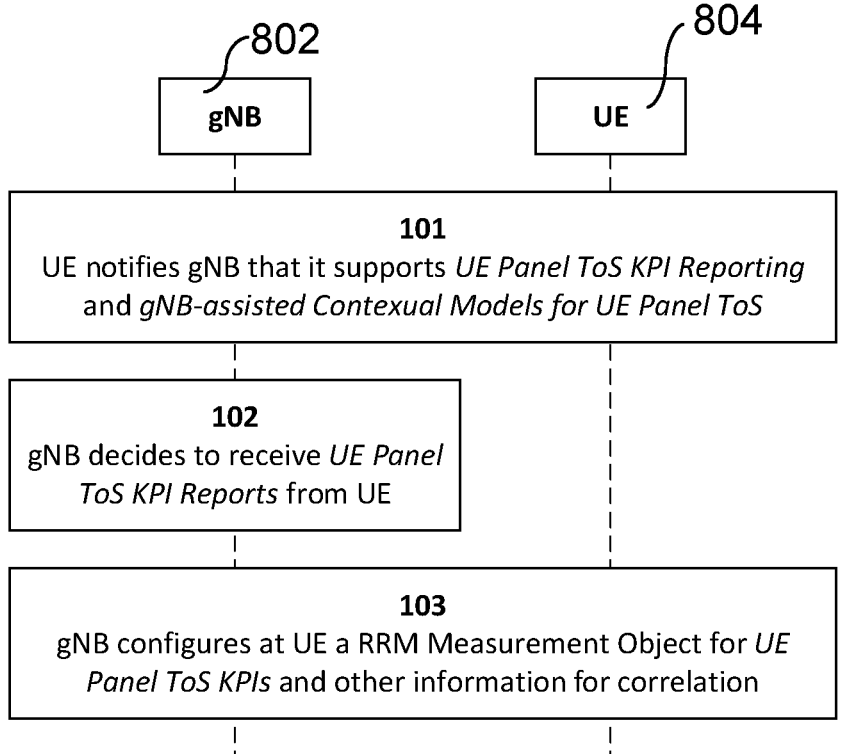
FIG. 8 is a flow-chart of a method according to an example.
Figure 9:
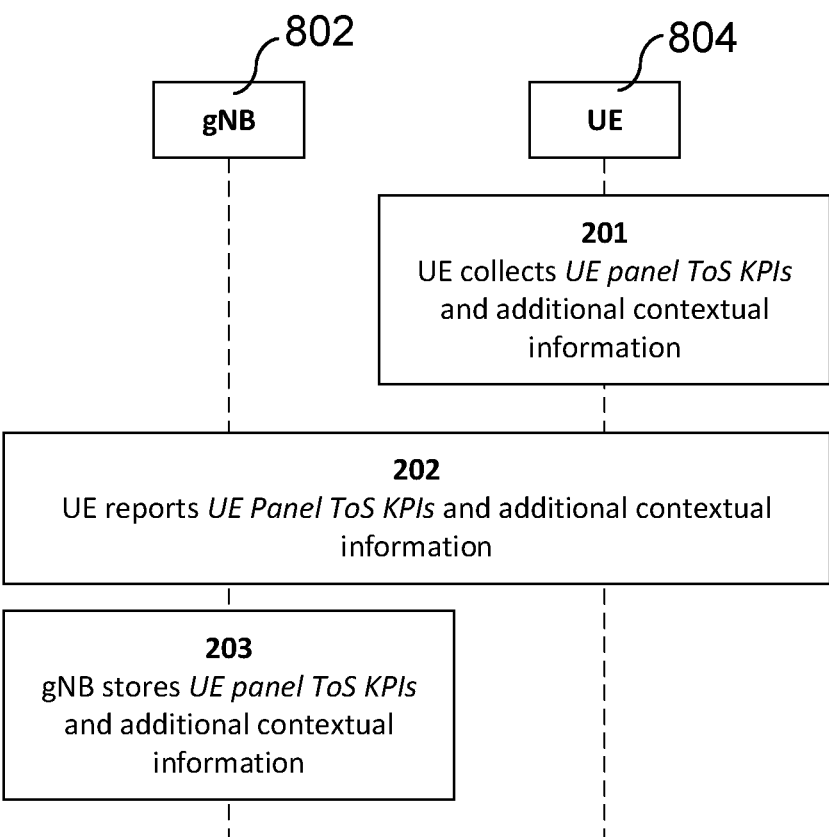
FIG. 9 is a flow-chart of a method according to an example.

FIG. 8 shows sub-steps relating to UE setup by the gNB, to enable the UE to to report UE panel ToS KPIs. The gNB is schematically shown at 802 and the UE is schematically shown at 804.

At sub-step 101, UE 804 notifies gNB 802 that the UE supports the service i.e. UE Panel ToS KPI Reporting and gNB-assisted Estimation Models for UE Panel ToS. In examples this can be done via e.g. an IE transmitted over RRC signaling (e.g. UE Capabilities).

At sub-step 102, gNB 804 decides to receive UE Panel ToS KPI Reports from UE 802.

At sub-step 103, the gNB configures the UE for UE ToS KPI reporting. In some examples, the gNB 802 does this with a RRM Measurement Object for UE Panel ToS KPIs and other additional contextual information.

Following sub-steps 101, 102 and 103, the gNB 802 is aware of the UE 804 supporting the collection of UE panel ToS KPIs, and the gNB 802 has configured the UE 804 to report back on those KPIs.

Step 2—Further Detail

FIG. 8 shows sub-steps relating to the UE 804 reporting to gNB 802 on UE antenna panel ToS KPIs in step 2.

In sub-step 201, UE 804 collects UE panel ToS KPIs (e.g. mean ToS in a UE panel, number of panel switches per BS beam, etc. . . . ). In examples the UE 804 also collects additional contextual information (e.g. cell ID, BS beam ID, UE beam ID, UE panel ID, distance to the cell, exact GPS location, time of day, etc . . . ).

In sub-step 202, UE 804 reports UE Panel ToS KPIs to gNB 802. In examples, UE 804 also reports additional contextual information to gNB 802. In one exemplary (but not limiting) implementation, this information is transmitted in an RRM Measurement Report.

At sub-step 203, the gNB 802 stores UE panel ToS KPIs. In examples, gNB 802 also stores the additional contextual information.

Following 201, 202 and 203, the UE 804 has collected and reported back to the gNB 802 measurement reports on the UE panel ToS KPIs. The KPI reports are collected and stored by the gNB 802 for later usage, e.g. for creating the estimation models for UE panel ToS.

Step 3—Further Detail

The generation of the estimation model, by gNB 802, on the UE panel ToS can be constructed in different ways. For instance, an expert in network planning may review a coverage map and mean system-level KPIs and determine beforehand which cells/regions/beams will have a low/middle high UE panel ToS. On the other hand, an automated process might collect feedback from UEs and build the estimation model from, for example, a rule-based procedure or a machine-learning procedure.

Figure 10:
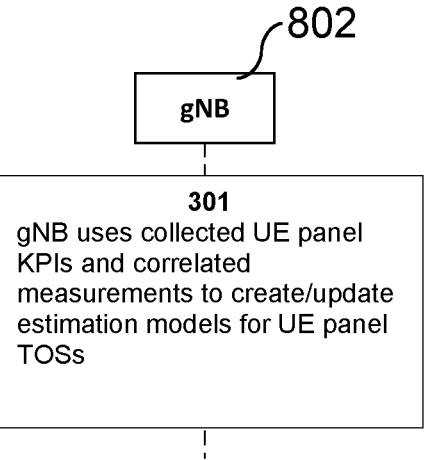
FIG. 10 is a flow-chart of a method according to an example.

FIG. 10 shows an exemplary (but not limiting) implementation of an automated procedure for building the estimation model at the gNB 804.

At sub-step 301, the gNB uses collected UE Panel KPIs and additional contextual information such as e.g. RRM measurements to create/update estimation models for UE panel ToSs. In one exemplary (but not limiting) implementation, the estimation model for the UE panel ToS is generated by an expert engineer or engineers, who look at the collection of all UE feedback on UE panel-related information and relevant contextual information, combine it with cell coverage maps and other auxiliary information (e.g. position of buildings and other blocks in the map, etc . . . ), and generate an estimation of what the mean ToS in a UE panel shall be per BS beam in the cell. In another exemplary (but not limiting) implementation, the estimation model is automatically constructed by a rule-based algorithm, which could e.g. estimate the mean ToS per BS beam from a collection of reported UE feedback. In another exemplary (but not limiting) implementation, the estimation model is automatically constructed by a machine learning model (e.g. a neural network classifier of sufficient/insufficient ToS in UE panels per beam) using a collection of the reported UE feedback. As a result of the sub-step 301, the gNB 802 has stored an estimation model for the UE panel ToS, that can be later used to transmit to UE 804 (and indeed other UEs).

Step 4—Further Details

Figure 11:
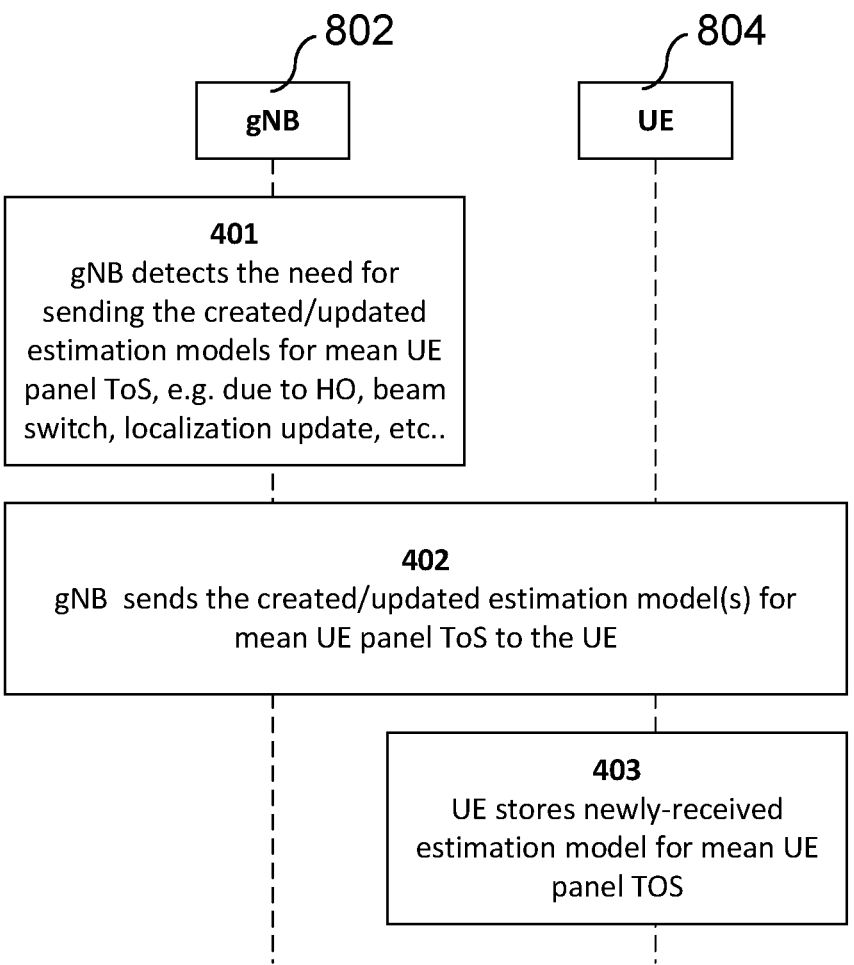
FIG. 11 is a flow-chart of a method according to an example.

FIG. 11 shows in more detail the process by which the gNB provisions to the UE the estimation model for UE panel ToS estimation.

In sub-step 401, gNB 802 detects a need for sending the a newly created or updated contextual model for UE panel ToS to UE 804. For example, this need could be because of (by way of non-limiting example) any one or more of: handover (HO), beam switch, location update.

In sub-step 402, the gNB 802 sends the newly created or updated estimation model(s) to the UE 804. For example, the gNB 802 may send this information by an IE transmitted over RRC signaling (e.g. RRC Setup/RRC Reconfiguration/RRC Release).

In sub-step 403, the UE 804 stores the newly received estimation model(s) for the UE 804 to use at a later stage.

Figure 12:
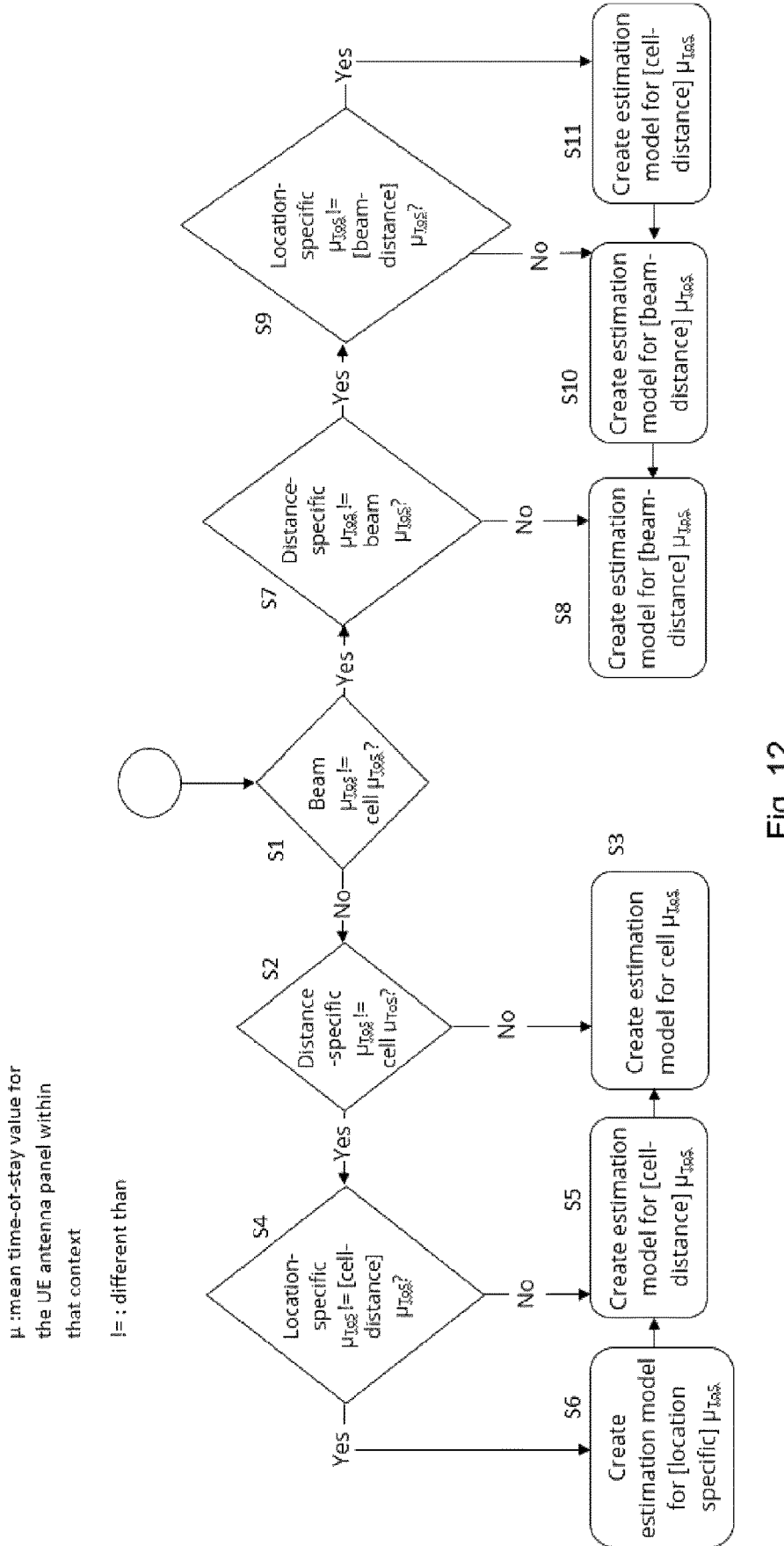
FIG. 12 is a flow-chart of a method according to an example.

FIG. 12 shown an exemplary (but not limiting) implementation of the sub-step 401 for the procedure at the gNB 802 for the generation of the estimation model for the UE panel ToS.

As shown in FIG. 12, the notation μ represents mean time-of-stay value for the UE antenna panel within that context, and !=means "different than".

So, with reference to FIG. 12, at S1 a determination is made as to whether Beam $\mu_{ToS}$ is different to cell $\mu_{ToS}$. When the determination at S1 is "no", then the method proceeds to S2.

At S2, a determination is made as to whether distance-specific $\mu_{ToS}$ is different to cell $\mu_{ToS}$. When the determination at S2 is no, then the method proceeds to S3.

At S3, the gNB creates the estimation model for cell $\mu_{ToS}$.

If the determination at S2 is yes, then the method proceeds to S4 where a determination is made whether location-specific $\mu_{ToS}$ is different to cell-distance $\mu_{ToS}$. When the determination at S4 is no, the method proceeds to S5.

At S5, the gNB creates an estimation model for cell-distance $\mu_{ToS}$.

When the determination at S4 is yes, the method proceeds to S6.

At S6, the gNB creates an estimation model for location specific $\mu_{ToS}$.

When, at S1, the determination is "yes" on the other hand, then the method proceeds to S7.

At S7, a determination is made as to whether distance-specific $\mu_{ToS}$ is different to beam $\mu_{ToS}$.

When the determination at S7 is no, the method proceeds to S8.

At S8, the gNB creates an estimation model for beam-distance $\mu_{ToS}$.

When the determination at S7 is yes, the method proceeds to S9.

At S9, a determination is made as to whether location-specific $\mu_{ToS}$ is different to beam-distance $\mu_{ToS}$.

When the determination at S9 is no, the method proceeds to S10.

At S10, the gNB creates the estimation model for beam-distance $\mu_{ToS}$.

When the determination at S9 is "yes", the method proceeds to S11.

At S11 the gNB creates an estimation model for cell distance $\mu_{ToS}$.

Thus it will be understood that, when generating one or more estimation models, the gNB may take in to account differences in ToS for different contexts of the UE. In other words, the gNB may determine a context of an estimation model to be created, based at least in part on differences of ToS of different contexts for the UE.

According to examples, the UE 804 identifies a contextual level (e.g. cell-wide; beam-wide; distance-wide; location-wide; or combinations of these) to be used to select the most appropriate estimation model to be used at the given time, from those previously provisioned by the gNB 802. For instance, it may be expected that fine-grained contextual levels (e.g. beam-wide) may provide substantially different UE panel ToS from coarse-grained contextual levels (e.g. cell-wide), hence correctly identifying the most appropriate granularity level is relevant. The meaning of "substantially different" (e.g. different by a threshold, or an arbitrary n standard deviation from the mean) might vary according to different operator policies.

Also described herein is an exemplary (but not limiting) implementation of an IE for carrying the provisioned estimation model of UE panel ToS. For example this IE may be used for the information transmitted by the gNB 802 to the UE 804 in sub-step 402. In one exemplary implementation, the IE may contain:

A first identifier. In some examples the first identifier comprises an estimation model identifier. In some examples, the estimation model identifier comprises an integer number allowing the UE 804 to decide whether the UE 804 should replace a previously received estimation model by a new estimation model. In some examples, this is a mandatory parameter of the IE.

A second identifier. In some examples the second identifier comprises a context type identifier. In some examples the context type identifier comprises a value (e.g. vector) of one or more entries of context indexer type identifiers. In some examples each context indexer type identifier comprises an enumerator entry indicating a scope of the context to which a given ToS applies. For example these values could be 0 for cell ID, 1 for beam ID, 2 for cell distance, 3 for exact location, 4 for time of day, etc. For instance, if the content of a given context identifier is a one-size vector {0} containing the context indexer type identifier 0, this means that the scope of this context identifier is the whole cell, i.e. the provisioned UE panel ToS shall encompass the whole cell identified by the cell ID. On the other hand, if the context identifier is a two-size vector {1,2} containing the context indexer type identifiers 1 and 2, this means that the scope of this context identifier is a given distance to the gNB while at a given specific beam identified by the beam ID, i.e. the provisioned UE panel ToS is relative to that distance from gNB at a given specific beam. This allows for great flexibility in terms of how to define the scope/context of the provisioned model. In some examples, this is a mandatory parameter of the IE.

A ToS field. In some examples this comprises a mean UE panel ToS field. In one exemplary (but not limiting) implementation this comprises a floating-point with the exact value of the UE panel ToS with some precision (e.g. 32-bits). In another exemplary (but not limiting) implementation this field might be an enumerator entry from a table containing specific UE panel ToS, e.g. 0 for 10 ms, 1, for 20 ms, 3 for 50 ms, 4 for 100 ms, 5 for 200 ms, 6 for 500 ms, 7 for 1000 ms, and so forth. There are other possible ways to represent the UE panel ToS; however, what will be appreciated is that some form of communicating the UE panel ToS is provided to the UE 804. The UE 804 may then later use the ToS information in the decision process of whether or not to execute the narrow UE beam alignment. In some examples, this is a mandatory parameter of the IE.

A ToS deviation field. In some examples the ToS field comprises a standard deviation for the UE panel ToS. In one exemplary (but not limiting) implementation this field may comprise a floating-point with the exact value of the standard deviation of the UE panel ToS with some precision (e.g. 32-bits). In another exemplary (but not limiting) implementation this field may be an enumerator entry from a table containing specific standard deviation of the UE panel ToS, e.g. 0 for 10 ms, 1 for 20 ms, 3 for 50 ms, 4 for 100 ms, 5 for 200 ms, 6 for 500 ms, 7 for 1000 ms, and so forth. There other possible ways to represent the standard deviation of the UE panel ToS; however, what will be appreciated is that some form of communicating the standard deviation of the UE panel ToS is provided to the UE 804. The UE 804 (or gNB 802) may then use this standard deviation information later to determine a degree of confidence in this piece of information. In some examples this is an optional parameter of the IE.

A duration field. In some examples the duration field comprises an expected P3 procedure duration. In one exemplary (but non-limiting) implementation the expected P3 procedure duration field comprises a floating-point with the exact value of the expected duration of the P3 procedure with some precision (e.g. 32-bits) In another exemplary (but not limiting) implementation the value might just be an enumerator entry from a table containing specific expected P3 procedure duration , e.g. 0 for 10 ms, 1 for 20 ms, 3 for 50 ms, 4 for 100 ms, 5 for 200 ms, 6 for 500 ms, 7 for 1000 ms, and so forth. There are other possible ways to represent the expected P3 duration; however, it will be understood that in examples some form of communicating the expected P3 duration is provided to the UE. This information may be later used by the UE 804 to determine whether the expected UE panel ToS shall be enough for executing the P3 procedure for narrow UE beam alignment. In some examples this is an optional parameter of the IE.

An additional contextual information field. This field may contain further information such as e.g. time of day; mean azimuth; mean elevation, etc . . . In some examples these are optional parameters of the IE.

Figure 13:
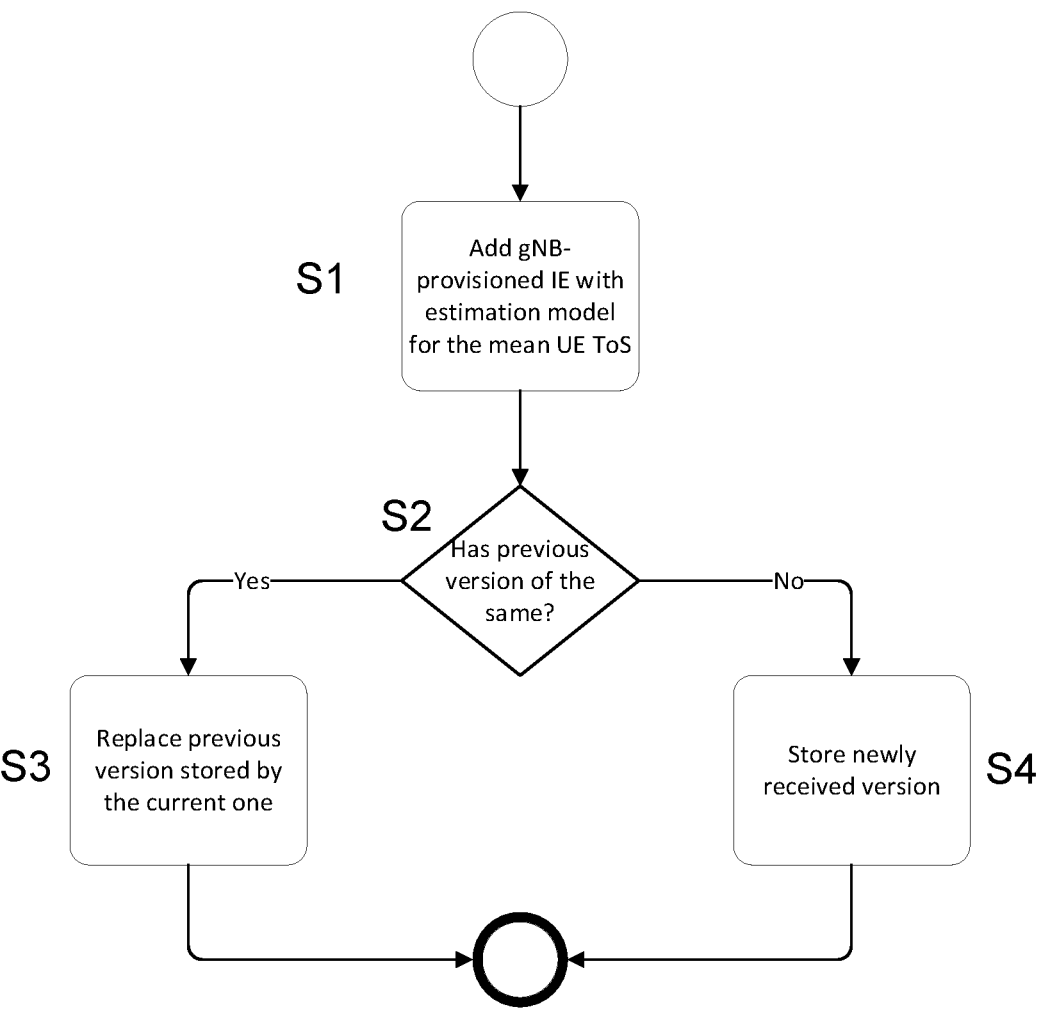
FIG. 13 is a flow-chart of a method according to an example.

Furthermore, there is now described in relation to FIG. 13 an exemplary (but not limiting) implementation of a decision procedure made at the UE 802. This corresponds to the sub-step 403 described above.

In S1, the gNB provisions the UE with an estimation model.

As shown at S2, the UE checks whether it has a previous version of the same estimation model.

If the UE does have a previous version of the estimation model, the UE replaces the previously stored one by the newly-received one (S3).

Otherwise, the UE simply stores the newly-received version (S4).

This way, the UE can always maintain the latest version of the received estimation model. In some examples this sub-step 403 can be considered as optional. In another exemplary (but not limiting) implementation the UE might simply store the new model and its ID number without any check of whether there is a previously stored version.

Step 5—Further Details

There is now described in further detail step 5, where the UE uses the estimation model received from the gNB in order to determine whether or not to trigger narrow UE beam alignment.

Initially, the UE begins by retrieving the most appropriate estimation model for the UE panel ToS in case it is needed by the UE for deciding whether to execute the narrow UE beam alignment.

As shown at sub-step 501, which is triggered in response to an antenna panel switch by the UE, the UE starts a timer $T_{ToS}$. Timer $T_{ToS}$ accounts for how long the UE stays with the newly selected UE panel.

Then, as shown at sub-step 502, the UE determines that it is time to decide whether or not to trigger a narrow UE beam alignment procedure. In one exemplary (but not limiting) implementation, the UE decides to do this periodically, to keep the gNB-UE link beam pairs optimally selected. In another exemplary (but not limiting) implementation, the UE triggers the evaluation upon each UE panel switch, to quickly align the gNB-UE link beam pairs. In yet another exemplary (but not limiting) implementation, the UE triggers the evaluation upon BS beam switch, again to quickly align the gNB-UE link beam pairs.

Then, as shown in sub-step 503, the UE retrieves contextual information available to the UE. In some examples this comprises all available instantaneous contextual information at the UE's disposal at that time. This enables the UE to correctly identify which of the provisioned estimation models to use to obtain an estimation of the UE panel ToS. The contextual information may include (but is not limited to) any one or more of: the cell ID of the cell the UE is associated with at that time; the serving beam ID i.e. the BS beam serving the UE at that time; the serving UE panel ID i.e. the ID of the antenna panel selected by the UE as the active UE antenna panel at that time; the distance to the cell i.e. the distance from the UE to the BS; GPS location of the UE; and potentially others. In some examples the UE does this by retrieving the information stored in the memory of the UE and/or accessing information from onboard sensors such as, for example, GPS.

In sub-step 504, the UE selects an estimation model from amongst its stored estimation models for determining UE panel ToS. In examples, the UE selects the estimation model with the finest level of granularity, using the available instantaneous contextual information at the UE's disposal. For instance, if the UE has previously received from the gNB two contextual model entries, e.g. one cell-wide and another beam-wide, and the UE has at its disposal both the cell ID and the beam ID, the UE will opt to use the beam-wide estimation model, as it is the finer-grained option in that instance. The beam-wide estimation model is hence the most appropriate model for that context, due to the likeness of the model to the specific UE panel ToS scenario the UE is experiencing at that time.

After the UE has retrieved the most appropriate estimation model for estimating the UE panel ToS, the then estimates UE panel ToS using the selected estimation model. The UE may then decide, based on the estimated antenna panel ToS, whether it is worthwhile the UE conducting the narrow UE beam alignment procedure. The UE can also track or monitor whether this decision was correct or not for later feedback to the gNB. In more detail, as shown at sub-step 505, the UE checks whether the estimated UE panel ToS ($E\mu_{ToS}$) is greater than an expected time to conduct narrow UE beam alignment ($Min\Delta T_{P3}$). In other words, the UE checks whether $E\mu_{ToS}>Min\Delta T_{P3}$. To determine $E\mu_{ToS}$ the UE may use, for example, the provided UE panel ToS from the estimation model selected in sub-step 504. For the expected time to conduct narrow UE beam alignment ($Min\Delta T_{P3}$), in one exemplary (but not limiting) implementation, the UE may use an expected time to conduct narrow UE beam alignment optionally provided by the gNB in the estimation model. In another exemplary (but not limiting implementation), the UE may track mean duration of past narrow UE beam alignment procedures in a given context, and use that tracked information for determining $Min\Delta T_{P3}$.

When, as a result of the sub-step 505, the UE determines that the estimated UE panel ToS is less than the expected time to conduct narrow UE beam alignment, then the UE does not trigger the narrow UE beam alignment. In some examples, the UE continues utilizing a wide UE beam for as long as the UE stays with the same selected BS beam and the same selected UE panel.

When, as a result of the sub-step 505, the UE determines that the UE panel ToS is greater than the expected time to conduct narrow UE beam alignment, then the UE decides to execute P3 narrow beam alignment by triggering step 6 where the narrow UE beam alignment procedure is conducted (described in more detail further below).

In some examples, whether the outcome of step 505 is "yes" or "no", the method proceeds to step 506. In sub-step 506 the timer $T_{ToS}$ is stopped when the UE has to switch UE panels, and the time value is recorded. In some examples the recorded time value is stored for later reporting back to the gNB.

Step 6—Further Detail

Figure 15:
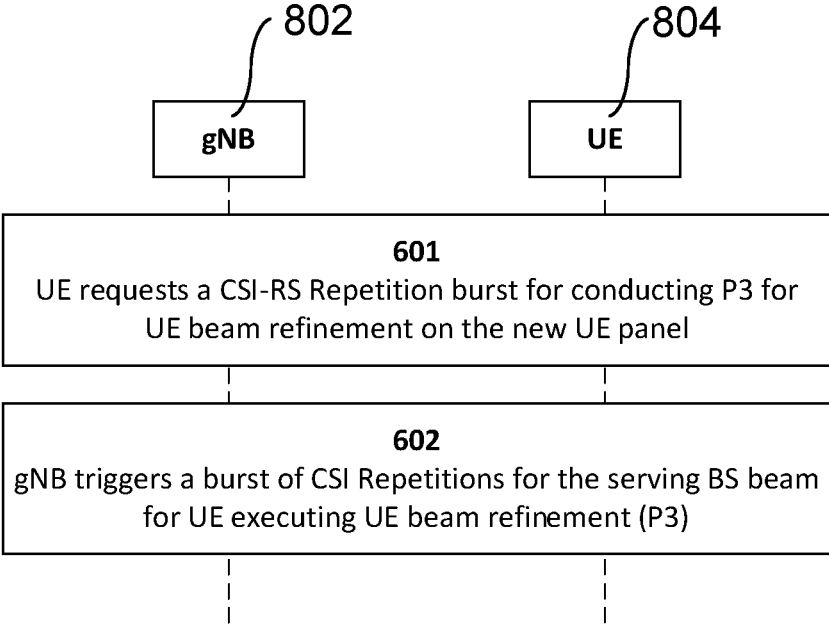
FIG. 15 is a flow-chart of a method according to an example.

Step 6, where the UE executes or performs the narrow UE beam alignment procedure will now be described in more detail with respect to FIG. 15.

At sub-step 601 the UE 804 may actively request the CSI-RS repetition burst by utilizing the next UL grant after the decision to trigger narrow UE beam alignment. In some examples the UE may request a CSI-RS repetition burst via e.g. DCI indication or RRC signalling. In another exemplary (but not limiting) implementation, the UE 804 might execute narrow UE beam sweeping sequentially at each subsequent opportunity for the CSI-RS for the serving BS beam.

Then, as shown in sub-step 602, the gNB 802 triggers a burst of CSI-RS repetitions for the serving BS beam for the UE executing narrow UE beam alignment (P3 procedure). In examples, the UE 804 performs the reception of each individual CSI-RS repetition burst. The UE 804 may also track or monitor whether the narrow UE beam alignment was executed to its completion or not. For example, UE may perform this tracking or monitoring for the purpose of later evaluating the sub-step 506 described above.

Step 7—Further Detail

Figure 16:
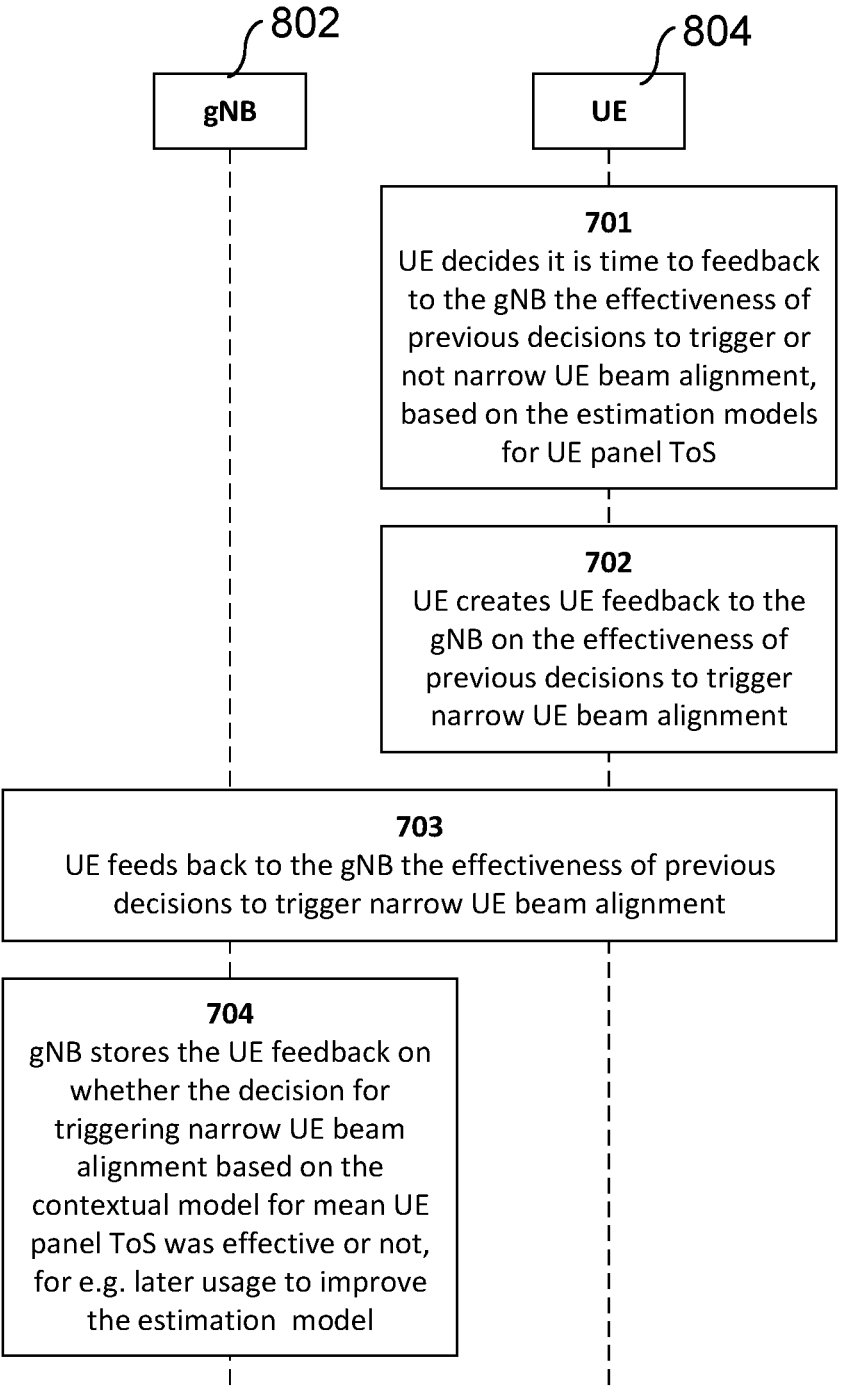
FIG. 16 is a flow-chart of a method according to an example.

With reference to FIG. 16 there will now be a further description of step 7, where the UE gives feedback to the gNB on the effectiveness of one or more estimation models that have been provisioned to the UE.

In sub-step 701, the UE 804 decides to feedback to the gNB information of the effectiveness of an estimation model for UE panel ToS previously provisioned to the UE, and which has been previously selected by the UE (e.g. see sub-step 504). According to some examples, by "effectiveness" is meant how accurate the estimation model was. For example, by "effectiveness" is meant how accurate the estimation model was in predicting how much time the UE remained selecting that UE antenna panel as the active UE antenna panel. For example, an estimation model is considered effective if it enabled the UE to accurately estimate a panel (ToS). As previously mentioned, the effectiveness of the estimation model may be determined based on a comparison between the estimated ToS and an actual ToS observed in practice.

In one exemplary (but not limiting) implementation, the decision to provide feedback to the gNB is due to a periodic timer being triggered. In another exemplary (but not limiting) implementation, the decision to provide feedback is taken by the UE in response to a decision to perform narrow UE beam alignment based on an estimation model. In some examples, feedback is provided each time narrow UE beam alignment is performed based on an estimation model. In another exemplary (but not limiting) implementation the UE 804 is configured to transmit the feedback after a given threshold on the number of narrow UE beam alignment decisions is reached. In some examples the number of UE beam alignment decisions includes only decisions to perform the narrow UE beam alignment. In some examples, the number of UE beam alignment decisions includes decisions to perform the narrow UE beam alignment and decisions not to perform narrow UE beam alignment. In some examples, the threshold number of UE beam alignment decisions comprises 10 decisions.

Then, in sub-step 702, the UE 804 creates the UE feedback message for sending to the gNB 802. In examples, the feedback message contains information on actual UE panel ToS observed for the given context (e.g. cell-wide, beam wide etc.).

In some examples this UE feedback might be carried, in one exemplary (but not limiting) implementation, within an information element (IE). In some examples the IE comprises a sequence of UE panel ToS entries. In some examples, one or more of the entries (and in some examples each entry) comprises the following information:

An estimation model identifier. This enables the gNB to then determine to which estimation model the feedback relates to. In some examples, this is a mandatory field in the IE.

A UE panel ToS identifier. This identifies the UE panel ToS that has been observed. In examples, this is a mandatory field in the IE. In one exemplary (but not limiting) implementation, this identifier comprises a floating-point value. In some examples the floating-point value has an exact or near-exact value of the UE panel ToS with some precision (e.g. 32-bits). In another exemplary (but not limiting) implementation the ToS identifier might just be an enumerator entry from a table containing specific UE panel ToSs, e.g. 0 for 10 ms, 1 for 20 ms, 3 for 50 ms, 4 for 100 ms, 5 for 200 ms, 6 for 500 ms, 7 for 1000 ms, and so forth.

A standard deviation field for the UE panel ToS. In some examples this is an optional field in the IE. In one exemplary (but not limiting) implementation this field comprises a floating-point value. In some examples the floating point value has an exact or near exact value of the standard deviation for the UE panel ToS with some precision (e.g. 32-bits). In another exemplary (but not limiting) implementation the standard deviation field might just be an enumerator entry from a table containing specific standard deviation for the UE panel ToS, e.g. 0 for 10 ms, 1 for 20 ms, 3 for 50 ms, 4 for 100 ms, 5 for 200 ms, 6 for 500 ms, 7 for 1000 ms, and so forth;

As shown in sub-step 703, the UE 804 feeds back to the gNB the UE feedback message generated in sub-step 702. In examples the feedback message contains information on the actual UE panel ToS observed in the context (e.g. cell wide, beam wide etc.) of the estimation model previously selected in sub-step 504. In one exemplary (but not limiting) implementation, the UE feedback is transmitted over a RRM Measurement Report message.

As shown in sub-step 704, the gNB then stores the UE feedback on whether the decision for triggering narrow UE beam alignment based on the estimation model for UE panel ToS was effective or not. This information can be stored by the gNB 802 for later use e.g. to improve the contextual model.

It will be noted that although step 7 (and its sub-steps 701, 702, 703 and 704) are optional in the sense that the triggering of narrow UE beam alignment based on estimation models could be achieved without these steps, step 7 (and its sub-steps 701, 702, 703 and 704) are useful for automating the process of improving the estimation models at the gNB side.

Figure 17:
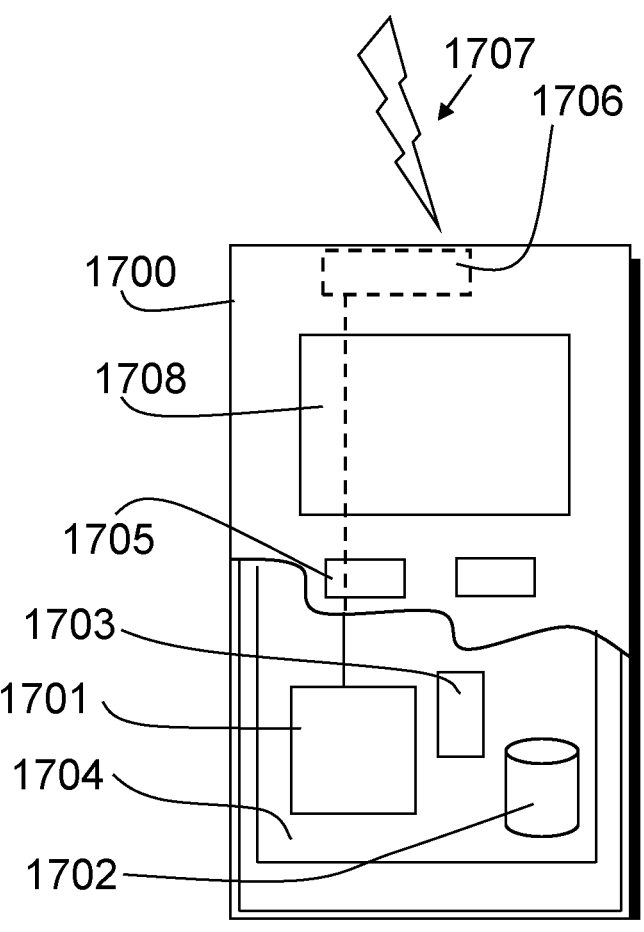
FIG. 17 shows an example of a communication device.

A possible wireless communication device will now be described in more detail with reference to FIG. 17 showing a schematic, partially sectioned view of a communication device 1700. Such a communication device is often referred to as user equipment (UE) or terminal, or mobile terminal (MT). UE 804 discussed above may comprise the features discussed below with respect to UE 1700. An appropriate mobile communication device may be provided by any device capable of sending and receiving radio signals. Non-limiting examples comprise a mobile station (MS) or mobile device such as a mobile phone or what is known as a 'smart phone', a computer provided with a wireless interface card or other wireless interface facility (e.g., USB dongle), personal data assistant (PDA) or a tablet provided with wireless communication capabilities, or any combinations of these or the like. A mobile communication device may provide, for example, communication of data for carrying communications such as voice, electronic mail (email), text message, multimedia and so on. Users may thus be offered and provided numerous services via their communication devices. Non-limiting examples of these services comprise two-way or multi-way calls, data communication or multimedia services or simply an access to a data communications network system, such as the Internet. Users may also be provided broadcast or multicast data. Non-limiting examples of the content comprise downloads, television and radio programs, videos, advertisements, various alerts and other information.

A wireless communication device may be for example a mobile device, that is, a device not fixed to a particular location, or it may be a stationary device. The wireless device may need human interaction for communication, or may not need human interaction for communication. In the present teachings the terms UE or "user" are used to refer to any type of wireless communication device.

The wireless device 1700 may receive signals over an air or radio interface 1707 via appropriate apparatus for receiving and may transmit signals via appropriate apparatus for transmitting radio signals. In FIG. 17 transceiver apparatus is designated schematically by block 1706. The transceiver apparatus 1706 may be provided for example by means of a radio part and associated antenna arrangement. The antenna arrangement may be arranged internally or externally to the wireless device.

A wireless device is typically provided with at least one data processing entity 1701, at least one memory 1702 and other possible components 1703 for use in software and hardware aided execution of tasks it is designed to perform, including control of access to and communications with access systems and other communication devices. The data processing, storage and other relevant control apparatus can be provided on an appropriate circuit board and/or in chipsets. This feature is denoted by reference 1704. The user may control the operation of the wireless device by means of a suitable user interface such as key pad 1705, voice commands, touch sensitive screen or pad, combinations thereof or the like. A display 1708, a speaker and a microphone can be also provided. Furthermore, a wireless communication device may comprise appropriate connectors (either wired or wireless) to other devices and/or for connecting external accessories, for example hands-free equipment, thereto.

Figure 18:
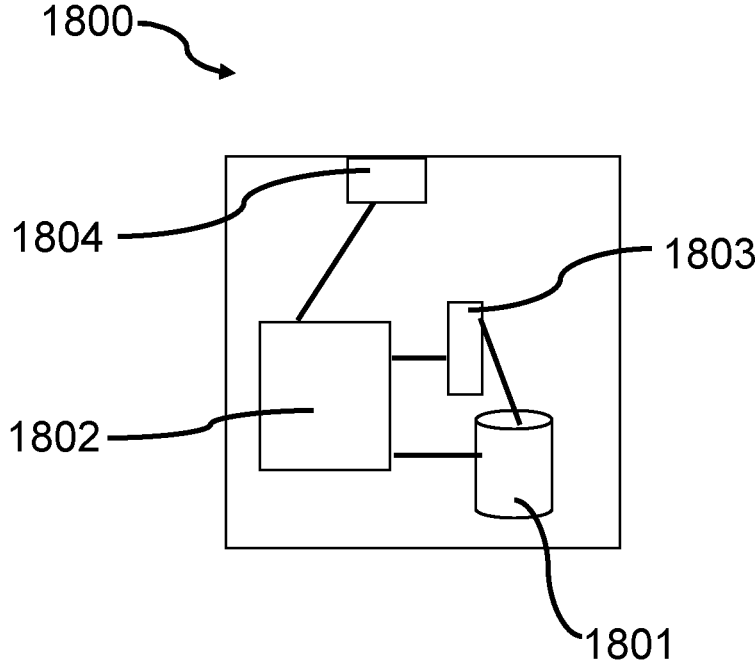
FIG. 18 shows an example of a control apparatus.

FIG. 18 shows an example of a control apparatus for a communication system, for example to be coupled to and/or for controlling a station of an access system, such as a RAN node, e.g. a base station, gNB, a central unit of a cloud architecture or a node of a core network such as an MME or S-GW, a scheduling entity such as a spectrum management entity, or a server or host. For example the gNB 802 described above may comprise the features of the control apparatus shown in FIG. 18. The control apparatus may be integrated with or external to a node or module of a core network or RAN. In some embodiments, base stations comprise a separate control apparatus unit or module. In other embodiments, the control apparatus can be another network element such as a radio network controller or a spectrum controller. In some embodiments, each base station may have such a control apparatus as well as a control apparatus being provided in a radio network controller. The control apparatus 1800 can be arranged to provide control on communications in the service area of the system. The control apparatus 1800 comprises at least one memory 1801, at least one data processing unit 1802, 1803 and an input/output interface 1804. Via the interface the control apparatus can be coupled to a receiver and a transmitter of a base station. The receiver and/or the transmitter may be implemented as a radio front end or a remote radio head. For example the control apparatus 1800 or processor 1802, 1803 can be configured to execute an appropriate software code to provide the control functions.

FIG. 19 is a flow chart of a method according to an example. The flow chart of FIG. 19 is viewed from the perspective of an apparatus. For example, the apparatus may comprise a user equipment.

As shown at S1, the method comprises receiving one or more estimation models at the apparatus.

As shown at S2, the method comprises determining an estimated time-of-stay of an antenna panel of the apparatus, using the one or more estimation models. According to some examples, the time of stay comprises a duration for which the antenna panel is active for transmission and/or reception.

As shown at S3, the method comprises determining whether to perform a narrow beam alignment procedure for the apparatus based on the estimated time-of-stay.

FIG. 20 is a flow chart of a method according to an example. The flow chart of FIG. 20 is viewed from the perspective of an apparatus. For example, the apparatus may comprise a base station.

As shown at S1, the method comprises sending one or more estimation models to a user equipment. The one or more estimation models is configured for enabling the user equipment to determine an estimated time-of-stay of an antenna panel of the user equipment. According to some examples, the time of stay comprises a duration for which the antenna panel is active for transmission and/or reception.

FIG. 21 shows a schematic representation of non-volatile memory media 2100a (e.g. computer disc (CD) or digital versatile disc (DVD)) and 2100b (e.g. universal serial bus (USB) memory stick) storing instructions and/or parameters 2102 which when executed by a processor allow the processor to perform one or more of the steps of the method of FIG. 19 or FIG. 20.

In general, the various embodiments may be implemented in hardware or special purpose circuits, software, logic or any combination thereof. Some aspects of the invention may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As used in this application, the term "circuitry" may refer to one or more or all of the following: (a) hardware-only circuit implementations (such as implementations in only analog and/or digital circuitry) and(b) combinations of hardware circuits and software, such as (as applicable): (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation. This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

The embodiments of this invention may be implemented by computer software executable by a data processor of the mobile device, such as in the processor entity, or by hardware, or by a combination of software and hardware. Computer software or program, also called program product, including software routines, applets and/or macros, may be stored in any apparatus-readable data storage medium and they comprise program instructions to perform particular tasks. A computer program product may comprise one or more computer-executable components which, when the program is run, are configured to carry out embodiments. The one or more computer-executable components may be at least one software code or portions of it.

Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD. The physical media is a non-transitory media.

The memory may be of any type suitable to the local technical environment and may be implemented using any suitable data storage technology, such as semiconductor based memory devices, magnetic memory devices and systems, optical memory devices and systems, fixed memory and removable memory. The data processors may be of any type suitable to the local technical environment, and may comprise one or more of general purpose computers, special purpose computers, microprocessors, digital signal processors (DSPs), application specific integrated circuits (ASIC), FPGA, gate level circuits and processors based on multi core processor architecture, as non-limiting examples.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

The foregoing description has provided by way of non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims. Indeed there is a further embodiment comprising a combination of one or more embodiments with any of the other embodiments previously discussed.

What is claimed is:

1. An apparatus comprising:
at least one processor; and
at least one memory including computer program code;
the at least one memory and the computer program code configured to, with the at least one processor, cause the apparatus at least to:
receive, from a network apparatus, one or more estimation models, wherein each of the one or more estimation models provides at least one parameter indicative of a time-of-stay for an antenna panel of the apparatus;
select, from the received one or more estimation models, an estimation model having a finest level of granularity that the apparatus can support;
determine an estimated time-of-stay of the antenna panel of the apparatus using the selected estimation model for a given context, the time-of-stay comprising a duration for at least one of which the antenna panel is active for transmission and reception; and
determine whether to perform a narrow beam alignment procedure for the apparatus based on the estimated time-of-stay.

2. An apparatus according to claim 1, wherein the given context comprises:
a duration for which the apparatus is communicating with a base station beam;
a duration for which the apparatus is in a cell; and
a duration for which the apparatus is in a geographical region.

3. An apparatus according to claim 1, wherein the one or more estimation models are comprised in an information element received during radio resource control signalling.

4. An apparatus according to claim 1, wherein the at least one processor and the computer program code are further configured to cause the apparatus to receive information of a mean expected duration of channel state information reference signal repetition bursts in a cell, and to use the information of mean expected duration of channel state information reference signal repetition bursts when determining whether to perform the narrow beam alignment procedure for the apparatus.

5. An apparatus according to claim 1, wherein the at least one processor and the computer program code are further configured to cause the apparatus to, in response to determining that the estimated time-of-stay meets or exceeds a threshold value, perform the narrow beam alignment procedure; or, in response to determining that the determined time-of-stay does not meet or exceed the threshold value, prevent performance of the narrow beam alignment procedure.

6. An apparatus according to claim 1, wherein the at least one processor and the computer program code are further configured to cause the apparatus to monitor an actual time-of-stay of the antenna panel, and to send feedback of effectiveness of the received one or more estimation models based on a comparison between the predicted time of stay and the actual time of stay.

7. An apparatus according to claim 1, wherein the at least one processor and the computer program code are further configured to cause the apparatus to send the feedback of effectiveness in an information element as part of radio resource control signalling.

8. An apparatus according to claim 7, wherein the at least one processor and the computer program code are further configured to cause the apparatus to send the feedback in response to one or more of: a periodic timer being reached; after each occurrence of a decision by the apparatus to perform narrow beam alignment; after a threshold number of decisions by the apparatus to perform narrow beam alignment.

9. A method performed by a user equipment, the method comprising:

receiving, from a network apparatus, one or more estimation models, wherein each of the one or more estimation models provides at least one parameter indicative of a time-of-stay for an antenna panel of the apparatus;

selecting, from the received one or more estimation models, an estimation model having a finest level of granularity that the apparatus can support;

determining an estimated time-of-stay of an antenna panel of the apparatus using the selected estimation model for a given context, the time-of-stay comprising a duration for which the antenna panel is active for at least one of transmission and reception; and determining whether to perform a narrow beam alignment procedure for the apparatus based on the estimated time-of-stay.

* * * * *